United States Patent [19]

Itoh et al.

[11] 4,449,293

[45] May 22, 1984

[54] COIL WINDING AND INSERTING MACHINE

[75] Inventors: Fumikazu Itoh, Fujisawa; Yasuhiro Fujita, Yokosuka; Takashi Kobayashi, Fujisawa; Takao Mifune, Ichikawa, all of Japan

[73] Assignee: Hitachi, Ltd., Tokyo, Japan

[21] Appl. No.: 338,075

[22] Filed: Jan. 8, 1982

[51] Int. Cl.³ ............................................ H02K 15/06
[52] U.S. Cl. ........................................ 29/736; 29/596; 140/92.1
[58] Field of Search ................ 29/596, 732, 734, 736, 29/564.1; 140/92.1

[56] References Cited

U.S. PATENT DOCUMENTS 4,299,023 11/1981 Tanaka et al. ........................ 29/596

Primary Examiner—Carl E. Hall
Attorney, Agent, or Firm—Antonelli, Terry & Wands

[57] ABSTRACT

A coil winding and inserting machine suitable for winding stator coils of 3-phase multipolar motors. The machine has a plurality of independently liftable tooling blades and auxiliary plates. Three winding forms are formed simultaneously or in a predetermined sequence, each being constituted by two tooling blades and one selectively lifted auxiliary plate. Three flyers corresponding to the three winding forms are rotated around these winding forms to form coils of the first pole of respective phases. Then, the flyers make a 180° indexing rotation and coils of the second pole are formed in the same manner as the coils of the first pole. After the winding of all coils, the coils are inserted into the stator core together with the wedges. Accordingly, it is possible to form the coils of u, v and w phases without cutting wires between two poles of respective phases, while ensuring an equal circumferential length of coils of all phases.

5 Claims, 37 Drawing Figures

FIG. II

F I G. 14
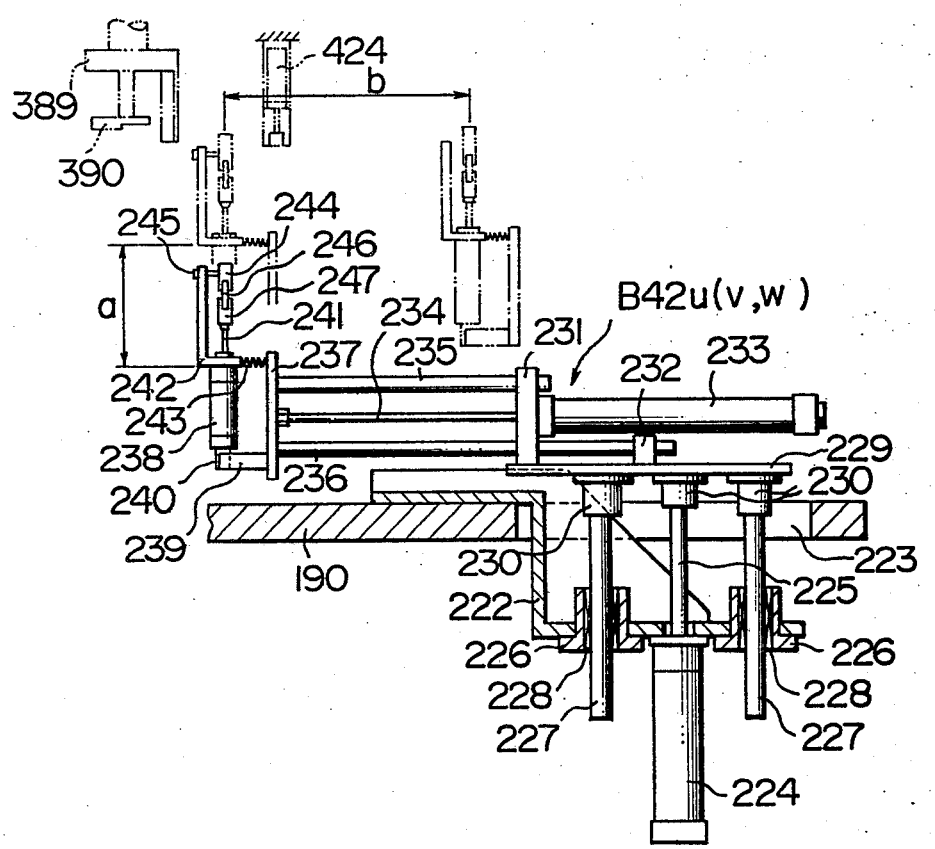

COIL WINDING AND INSERTING MACHINE

BACKGROUND OF THE INVENTION

The present invention relates to a machine for winding and inserting coils of the stator of a 3-phase multipolar motor and, more particularly, to a coil winding and insertion machine in which the coils are directly wound around tooling blades of an inserter and then inserted into the slots of the stator core.

A coil winding and inserting machine of the aforementioned type is disclosed, for example, in U.S. Pat. No. 4,299,023, wherein coils are directly wound around the tooling blades of the inserter, with the thus wound coils being directly inserted into the slots of the stator core.

This coil winding and inserting machine is suitable for winding and inserting the stator coil of variable speed motors, i.e. motors having at least two different speeds, such as single-phase 4-pole motors.

More specifically, this known machine has three winding means and a coil winding head. As the coil winding head is located in sequence beneath three winding means, the main coils for high-speed operation, main coils for low-speed operation and an auxiliary coils for determining the rotation direction at the time of starting of the motor are formed successively by the first winding means, second winding means and the third winding means, respectively, and the thus formed coils are inserted into the slots in the stator core at the insertion station.

This machine, however, cannot apply to the winding and insertion of the stator coils of 3-phase multipolar motor because, in such a use, this machine cannot make a continuous winding of a each phase without discontinuity of crossover wire between the poles.

Namely, in the stator coil of a 3-phase bipolar motor, three phases u, v and w are arranged at 120° phase differential, with each phase having two poles arranged at 180° interval. The coils of the first pole of all phases are required to have an equal circumferential length and the same applies also to the coils of the second pole.

For effecting the coil winding with this machine without cutting the crossover wire between poles, it is necessary to take the following procedure that the winding is at first made by the first winding means to make the two poles of the u phase and then by the second winding means to make the two poles of the v phase followed by the winding of the two poles of the w phase by the third winding means. Consequently, coils of the u phase, v phase and the w phase are wound at the lowermost stage, intermediate stage and the uppermost stage in the coil winding head, respectively. As these coils are inserted into the stator core, coils are arranged in three stages in the order of u, v and w from the center to the outer side of the stator core. This means that lengths of the end turns of respective phases u, v and w on the end surface of the stator core are varied such that the length of end turns of u phase is smaller than that of the v phase which in turn is smaller than that of the w phase. Consequently, different phases have different circumferential lengths of coils and, hence, different electric resistances in the coils. Therefore, when the same voltage is applied to all phases, the driving torque generated in the stator coils fluctuates to cause an unsmooth rotation of the rotor of the motor, as well as vibration in the motor.

To avoid this problem, conventionally, the winding and insertion of the stator core of the 3-phase multipolar motor have been made by such a process including the steps of winding coils for each pole by a conventional winding machine, mounting the coils on an insert tooling in a predetermined sequence, inserting these coils to a stator core, and connecting the cross-over wires between poles of each phase.

This process is quite inefficient because it requires various troublesome works such as transfer of the coils from the coil winding means to the inserter tooling, connection of crossover wires between poles and so forth. In addition, the wires of the coils tend to become disoriented during the transfer to the inserter tooling, resulting in a deterioration of the quality of the coil after the insertion due to, for example, a cutting of the coil wire, a degradation of the insulation characteristics caused by damage on the wire, a projection of the coil out of the wedge, and so forth.

SUMMARY OF THE INVENTION

Accordingly, an object of the invention is to provide a coil winding and inserting machine capable of making the stator coil of a 3-pole multipolar motor without requiring discontinuation of the crossover wires between poles, by directly winding the coils on an inserter tooling and then inserting the coils into the slots of the stator core.

Another object of the invention is to provide a stator core winding and inserting machine which can shorten the time length required for the winding and processing of the crossover wires between poles thereby to remarkably improve the efficiency of the work.

Still another object of the invention is to provide an insertion device for stator coil, which is improved to permit an automatic winding and insertion of stator coils of 3-phase multipolar motor.

To this end, according to the invention, there is provided a coil winding and inserting machine comprising an inserter tooling having a plurality of independently reciprocable tooling blades, auxiliary plates corresponding to the number of required coils and arranged at a predetermined pitch around a circle formed by the tooling blades, with the auxiliary plates being movable up and down, three groups of winding forms for u, v and w phases arranged at 120° interval, with each winding form being formed by lifting two tooling blades and one auxiliary plate, and three flyers opposing to respective winding forms and corresponding to respective phases u, v and w and adapted to be rotated simultaneously to thereby wind a first pole of each phase on each winding form. After the winding of coils of the first poles, the winding forms are lowered while carrying the coils and, thereafter, the three flyers are moved to the positions for winding the coils of the next pole without cutting the crossover between the poles and the flyers to effect the winding of coils of the next pole. This operation is repeated to complete the winding of coils of all poles of respective phases such that the coils of all phases have an equal circumferential length. The coils are then inserted into the stator core together with wedges.

BRIEF DESCRIPTION OF THE DRAWINGS

FIG. 14 is an illustration of a starting lead holding unit shown in FIG. 11 as viewed in the direction of the arrow XIV;

DESCRIPTION OF THE PREFERRED EMBODIMENT

The invention will be fully described hereinunder through a preferred embodiment of the invention applied to the formation of a stator coil of a 3-phase bipolar motor, on an assumption that the stator core has thirty-six slots to permit winding of coils in three coils in each pole.

Figure 1:
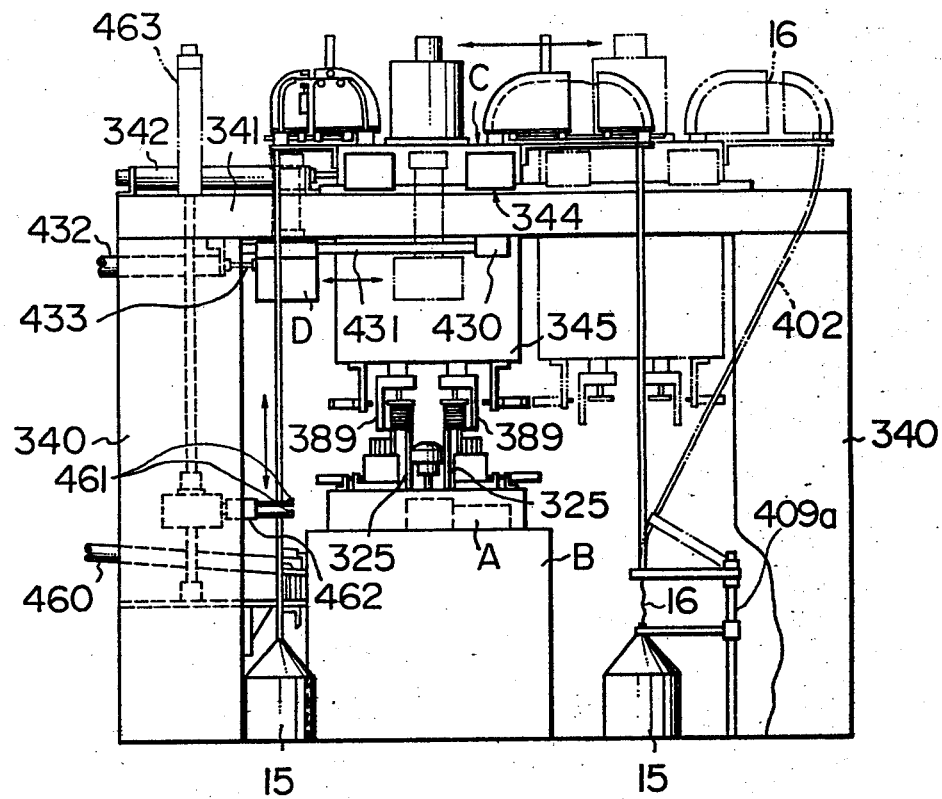
FIG. 1 is a front elevational view of a coil winding and inserting machine in accordance with an embodiment of the invention.

As shown in FIG. 1, the coil winding and inserting machine has a wedge supplying means A having an annular magazine provided in its outer peripheral surface with thirty-six grooves each receiving a wedge cut into a predetermined width and adapted to supply the wedge when coils are inserted into the stator core. The machine has also an inserter tooling B including thirty-six independently reciprocable tooling blades disposed in contact with the inner peripheral surface of the magazine containing the wedges, and six groups of auxiliary plates arranged at a 60° interval around the circle formed by the tooling blades, with each group of auxiliary plates being independently movable up and down and consisting of three auxiliary plates. The inserter tooling B is adapted to simultaneously form three winding forms each consisting of two tooling blades and one auxiliary plate at a 120° interval during a winding operation.

The coil winding and inserting machine further has a winding means generally designated by the reference character C having three flyers disposed above the inserter tooling B so as to oppose to the three winding forms, with the winding means C being movable between a winding position, in which the coil winding is carried out, and a stand-by position away from the winding position. The winding means C is adapted to wind coils simultaneously on three winding forms.

The coil winding and inserting machine has also a holding means D adapted to locate and hold the stator core, with the holding means D being disposed above the inserter B and movable between a first position, in which it receives the stator core, and a second position where the coils are inserted into the stator core.

As shown in FIGS. 2-5, the wedge supplying means A is placed on one of the plates of the inserter B which will be detailed later. The plate 176 of the inserter B has a hole 188. A holder 51 has a cylindrically shaped lower end projection 52 adapted to fit in the hole 188, and is provided, at a portion thereof, with a guide 53 extending in a direction tangential to an outer peripheral surface of the holder 51. This guide 53 is provided with a hole 54 for guiding a tape-like wedge sheet 10, and a hole 55 for guiding a ratchet arm which will be explained later. The terminal end of the hole 54 is joined with a notch 56 formed in the holder 51.

A cylindrical magazine 58 is rotatably mounted in the holder 51, through a pair of vertically arranged bearings 57. The magazine 58 is provided at its axially intermediate portion with thirty-six guide holes 59 communicating with the notch 56 and extending inwardly from the outer periphery of the magazine 58. The inner opening of each hole 59 is made sufficiently small so that the wedge, forced into the hole 59, may not project inwardly from the opening. A guide groove 60 extends through the wedge receiving position of the guide holes 59 in parallel with the axis of the magazine 58. A ratchet wheel 61, having thirty-six teeth, is fixed to the lower outer peripheral surface of the magazine 58. An annular stopper 62, having thirty-six V-shaped grooves is fixed to the upper surface of the ratchet wheel 61. An internally threaded case 63 is fixed to the lower portion of the periphery of the holder 51. A screw 64 meshes with the thread of the case 63 so as to compress a spring 65 which, in turn, urges a ball 66 inwardly from the inner peripheral surface of the holder 51 to fit in one of the V grooves of the stopper 62, so as to prevent the holder 51 from rotating. A bracket 67, fixed to the plate 176, supports a hydraulic motor 68 having an output shaft 69 coupled, by a joint 72, to a drive shaft 71 rotatably supported by the bracket 67 through a bearing 70. Three cams 73, 74 and 75 are integrally fixed to the drive shaft 71. A base 76 is fixed to the plate 176 so as to take a position between the holder 51 and the bracket 67. A projection 77, formed on the base 76, projects into the notch 56 of the holder 51 so as to oppose the rear end of the guide hole 54 to thereby serve as a stopper for the wedge sheet 10 supplied through the guide hole 54 and define a passage through which the sheet 10, cut into a predetermined width, is transferred.

Figure 2:
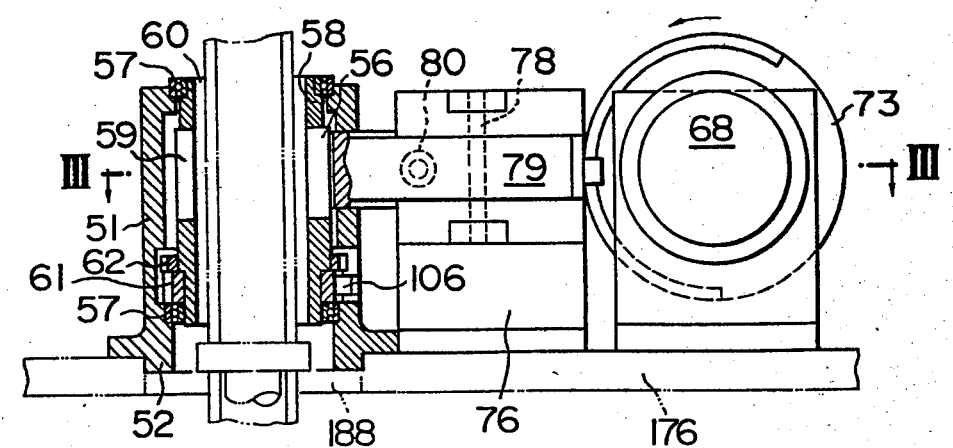
FIG. 2 is a partly-sectioned front elevational view of a portion of wedge supplying means incorporated in the machine shown in FIG. 1.

A shaper lever 79 is rotatably secured to the base 76 by means of a shaft 78 and is rotatably biased in the counter-clockwise direction, as viewed in FIG. 2, by a spring 80. The shaper lever 79 rotatably carries at its one end a cam roller 81 which makes a pressure contact with the cam 73. Therefore, the shaper lever 79 is rocked as the cam 73 rotates, so that the other end of the shaper lever 79 is swung between the magazine 58 and the projection 77 to thereby open and close the passage for the wedge and to shape the wedge.

A slider 82, slidably supported on the base 76, rotatably carries at its one end a cam roller 83 which rotatably fits in the groove of the cam 73. A pusher plate 84 is fixed to the other end of the slider 82. As the pusher plate 84 slides in accordance with the rotation of the cam 73, the sheet 10 cut into the predetermined width, is forced into the space between the holder 51 and the projection 77 so as to be shaped into a wedge. This wedge is further shaped upon abutment with the shaper lever 79 and the thus finished wedge is inserted into the groove 60 of the magazine 58. A slider 85 is slidably held by the base 76 and rotatably carries at its one end a cam roller 86 which is kept in pressure contact with the cam 74. A spring 87 acting between the slider 85 and the guide 53 serves to press the cam roller 86 against the cam 74. A movable blade 88, having a polygonal tubular form, is fixed to one end of the slider 85 such that a bore thereof slidably receives the pusher plate 84. On the other hand, a stationary blade 89 is fixed to the terminal end of the guide hole 54 of the guide 53. Then, the movable blade 88 is slidably displaced as the cam 74 rotates to cooperate with the stationary blade 89 in cutting the sheet 10 therebetween. A bracket 91 having a guide hole 90 is fixed to one end of the bracket 67.

A slide bar 92 slidably extends through the guide bore 90 and rotatably carries at its one end a cam roller 93 rotatably accommodated in the groove in the cam 75. A lever 94, rotatably held by a shaft 95, is provided on one end of the bracket 91. The lever 94 is provided at its one end with an elongated hole 96 which slidably receives a roller 97 rotatably supported by the other end of the slide bar 92. A pair of rollers 98, 99 for feeding the sheet 10 is rotatably supported by the other end of the lever 94. The roller 99 has an eccentric axis of rotation. A spring 100 is stretched between a pin 101 provided on the lever 94 and the pin 102 provided on the roller 99. Therefore, when the sheet 10 is fed by the rocking motion of the lever 94, the sheet 10 is clamped between the rollers 98 and 99, whereas, when the lever 94 is returned, the rollers 98 and 99 release the sheet 10.

A cam roller 103 is rotatably supported by the rear surface of the lever 94. A ratchet arm 104 slidably passes through the hole 55 of the guide 53. The cam roller 103 rotatably fits to the rear end of the ratchet arm 104. A cam groove 105 prevents a dropping of the cam roller 103 as a result of rocking of the lever 94. A ratchet claw 106 is rotatably supported by a shaft 107 projecting from the end of the ratchet arm 104 and is rotatively biased by a leaf spring 108. The ratchet pawl 106 engages with one of the teeth of the ratchet wheel 61 to rotate the wheel 61 by one step corresponding to the pitch of the teeth for each sliding stroke of the ratchet arm 104.

Figure 3:
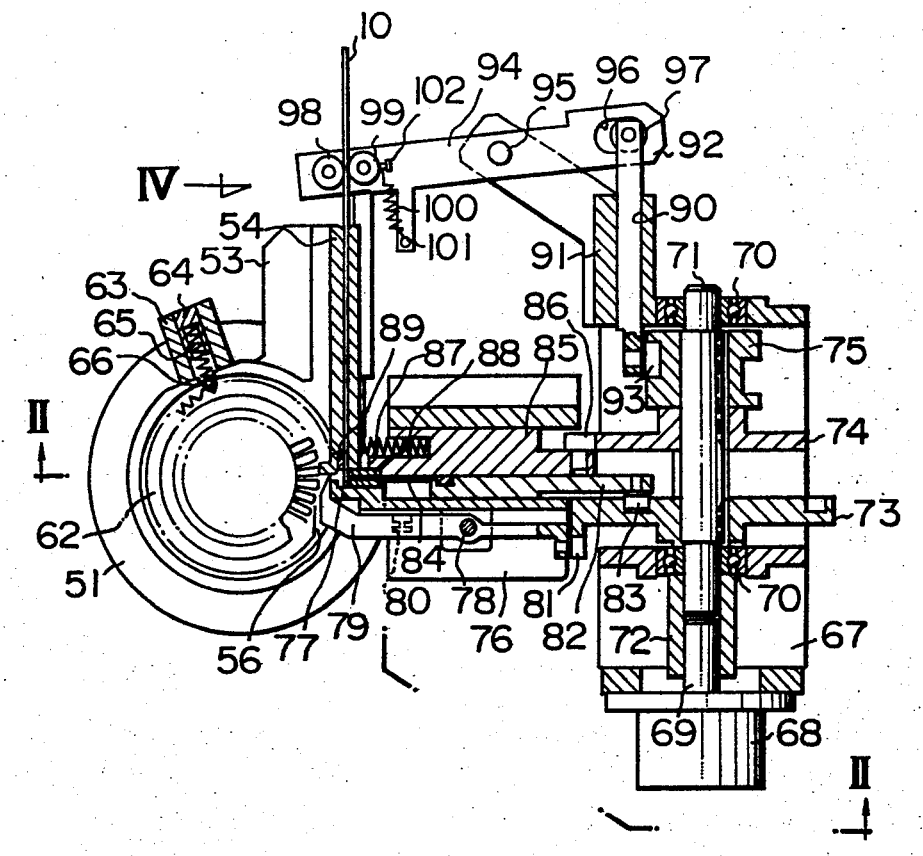
FIG. 3 is a partly-sectioned plan view of a portion of the wedge supplying means as shown in FIG. 2.
Figure 4:
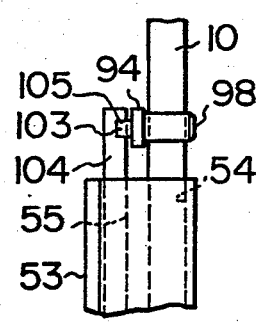
FIG. 4 is an illustration of a sheet supplying section in the means shown in FIG. 3 as viewed in the direction of an arrow IV.
Figure 5:
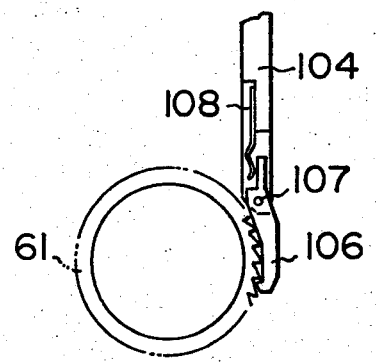
FIG. 5 is a sectional view taken along the line V—V of FIG. 2.

In operation, as the hydraulic motor 68 is activated in the state shown in FIG. 3, the movable blade 88 is operated by the cam 74 so as to cut the sheet 10. Thereafter, the pusher plate 84 is operated by the cam 73 so that the cut sheet 10 is forced into the space between the holder 51 and the projection 77 to make contact with the shaper lever 79 to shape the sheet 10 into the form of a wedge. Simultaneously, the lever 94 is rocked to retract the rollers 98, 99 and the ratchet arm 104, so that the ratchet claw 106 feeds and rotates the magazine 58 by one step. Thereafter, the shaper lever 79 is rocked as the pusher plate 84 is retracted, so that the passage for the wedge is closed. At the same time, the movable blade 88 is retracted to open the outlet of the hole 54 for passing the sheet 10. subsequently, the lever 94 is rocked so that the roller 98 and the roller 99 come to cooperate in clamping therebetween the sheet 10 and sending the same out. Concurrently with this operation, the ratchet claw 106 is moved ahead to bring the end of the latter into engagement with the next teeth of the ratchet wheel 106. At this time, the ratchet claw 106 is slightly rotated overcoming the force of the leaf spring 108 in order to slide over the tooth of the ratchet wheel 61. This operation is repeated to successively fill all of the thirty-six slots 60 in the magazine 58 with the wedges. As all of the slots 60 are occupied, the hydraulic motor 68 stops operating and prepares for the next wedge supplying operation.

Basically, as shown in FIGS. 6-19, the inserter B includes a base unit $B_1$, a driving unit $B_2$ in which driving means for lifting up and down the winding forms and for inserting the coils and wedges are concentrated, a selector unit $B_3$ adapted to select the tooling blades and the auxiliary plates to be lifted during winding coils, a top unit $B_4$ which constitutes winding forms during the winding and a tooling head during the insertion, and an insertion unit $B_5$ for inserting the coils into the stator core.

Figure 6:
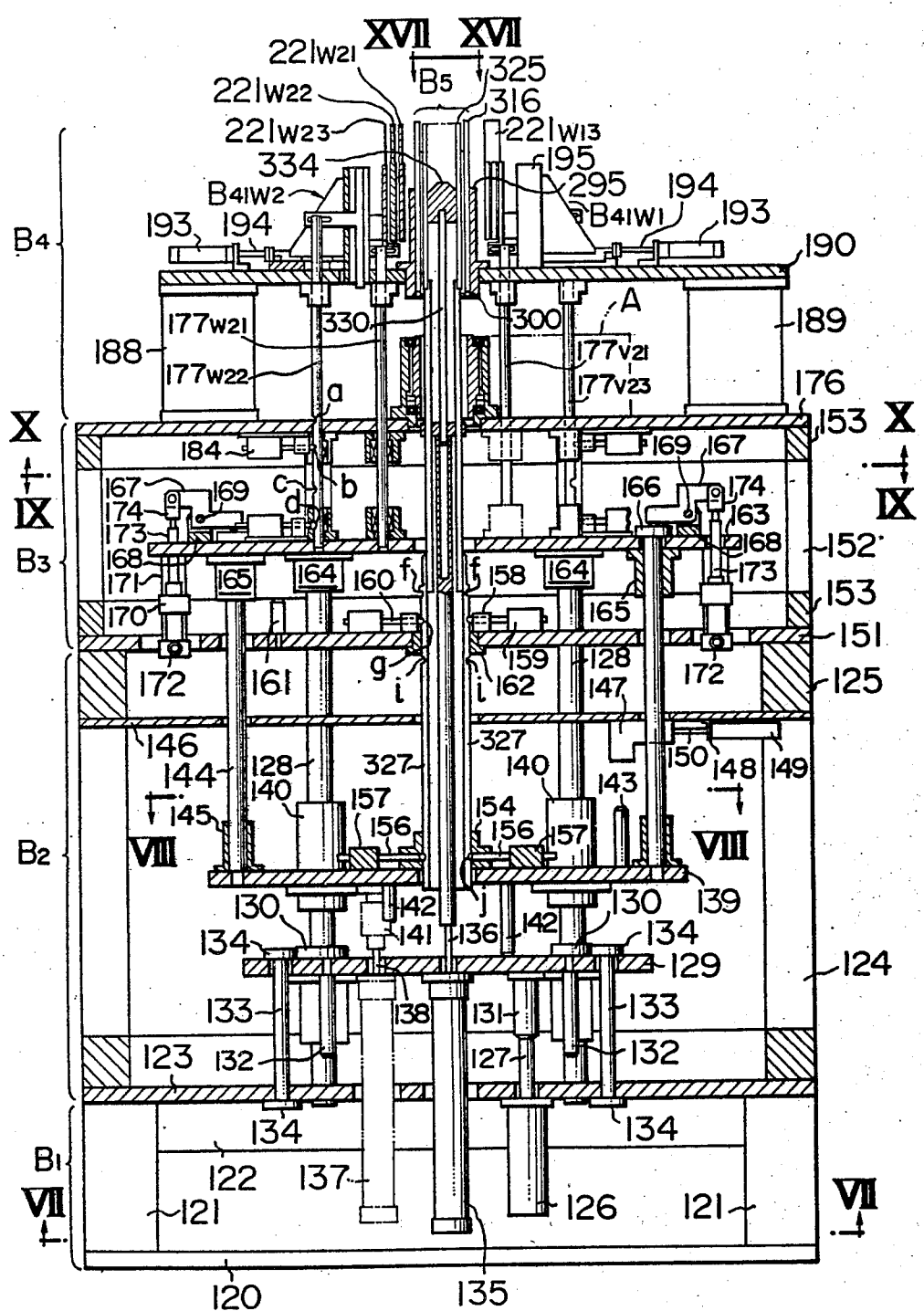
FIG. 6 is a front elevational sectional view of an inserter in the machine shown in FIG. 1.

Referring to FIG. 6, the base unit $B_1$ has posts 121 extending from a base 120 and a beam 122 interconnecting the upper ends of the posts 121, and forms a space which accomodates the driving sources of the driving unit $B_2$.

Figure 7:
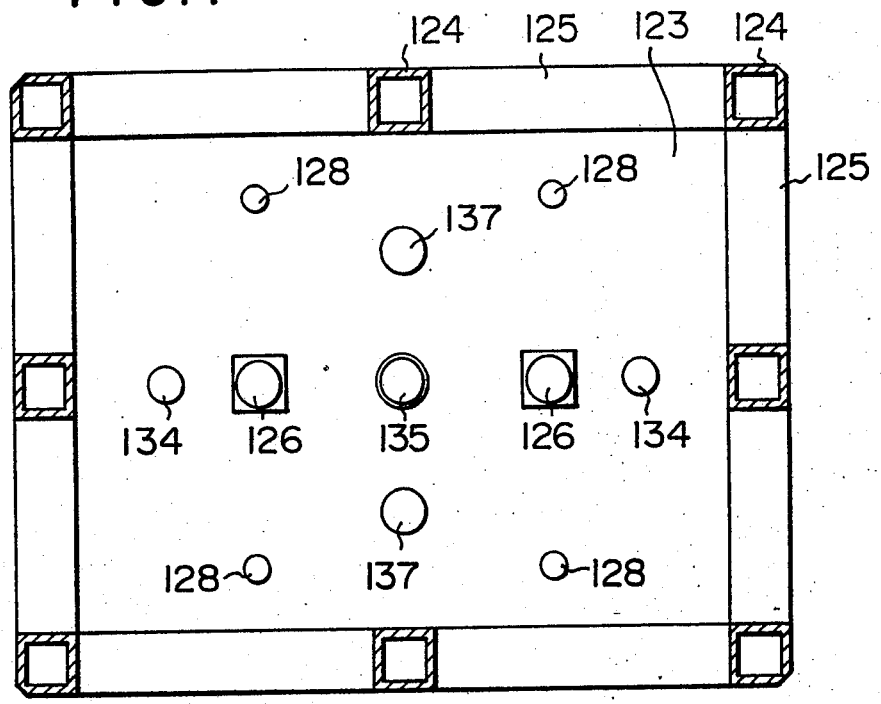
FIG. 7 is a sectional view taken along the line VII—VII of FIG. 6, showing the bottom of a driving unit.
Figure 8:
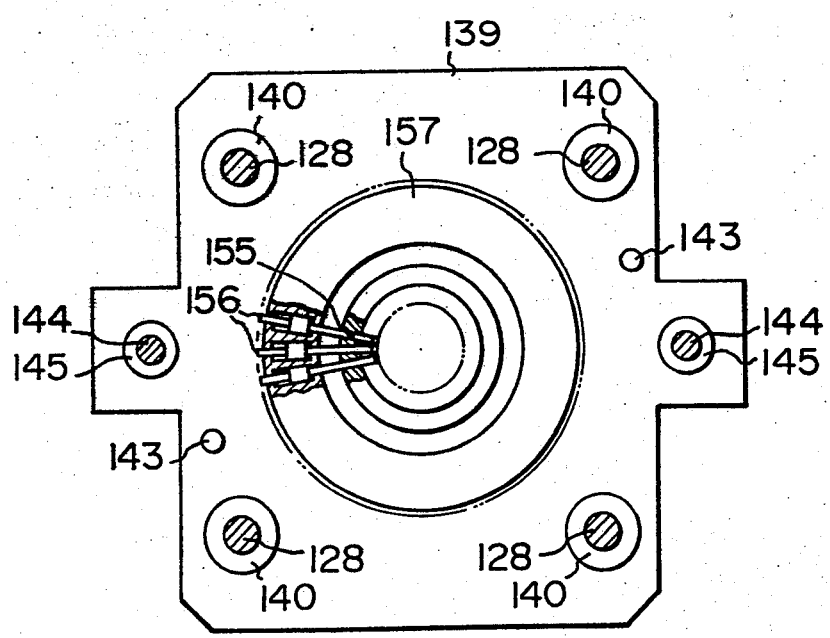
FIG. 8 is a sectional view taken along the line VIII—VIII of FIG. 6, showing the upper surface of a drive unit and lower arrangement of a selector unit.

Referring to FIGS. 6 thru 8, the driving unit $B_2$ includes posts 124 extending up from a base 123 disposed on the posts 121. The upper ends of the posts 124 are interconnected by a beam 125. A pair of cylinders 126 are fixed to the lower surface of the base 123 at a predetermined pitch. The cylinders 126 have rods 127 which project through holes in the base 123 to the upper side of the base 123. Four guide bars 128 protrude from the upper surface of the base 123 at a predetermined interval. A first plate 129 is slidably supported by the guide bars 124 through four guide bushes 130 fixed thereto, and is connected to the rods 127 of the cylinders 126 through joints 131. A pair of stoppers 132 are provided on the lower surface of the plate 129 so as to oppose the base 123. Also, a pair of stoppers 133 extend through the base 123 and the plate 129 and are provided at ends thereof with flanges 134.

As the cylinders 126 are actuated, the plate 129 is moved up and down along the guide bars 128. The lower end of the stroke of the plate 129 is limited by the stopper 132, while the upper end of the stroke is limited by the stopper 133. A cylinder 135 is fixed to the lower side of the center of the plate 129. The cylinder 135 has a rod 136 projecting above the plate 129. A pair of cylinders 137 are secured to the lower surface of the plate 129 at both sides of the cylinders 135. These cylinders 137 have rods 138 which also project above the plate 129.

A second plate 139 is slidably supported by the guide bars 128 through four guide bushes 140 fixed thereto, and is connected to the rods 138 of the cylinders 137 through joints 141. A stopper 142 is secured to the lower surface of the plate 139 so as to face the plate 129 to limit the lower end of the stroke of the plate 139 in relation to the plate 129. A pair of rods 143 extend up from the upper face of the plate 139. A pair of guide bars 144 are mounted to stand upright from the plate 139 through holders 145 fixed to the upper surface of the plate 139. A plate 146 is supported on the lower surface of the beam 125 interconnecting the upper ends of the posts 124. A pair of stoppers 147 are slidably supported on the lower face of the plate 146 and are connected to the rod 150 of a cylinder 149 which is supported on the lower surface of the plate 146 through a bracket 148. The stoppers 147 are adapted to be reciprocated by the cylinders 149, between an operating position in opposition to the rods 143 and a stand-by position remote from the operating position. Therefore, the upper limit of the vertical stroke of the plate 139 caused by the cylinder 137 is switched in stages according to the position of the stoppers 147.

As shown in FIGS. 6–8 and 10, the selector unit $B_3$ includes, posts 152 extending upwardly from the upper surface of a plate 151 disposed on the beams 125 of the driving unit $B_2$. The posts 152 are connected to each other at their upper and lower ends by means of beams 153. A part of a first selector mechanism of the selector unit $B_3$ is also mounted on the plate 139 of the driving unit $B_2$. The first selector mechanism is adapted to selectively lift and lower the tooling blades which will be mentioned later. A guide 154 is fixed to the plate 139 so as to contact the outer periphery of the tooling blades. The guide 154 is provided with thirty-six radial through bores 155 extending from the inner periphery to the outer periphery through the thickness thereof. A disc-like cylinder unit 157 has thirty-six independently driven pistons 156 which are radially arranged at a predetermined pitch. The disc-like cylinder unit 157 is mounted on the plate 139 concentrically with the guide 154. The ends of the pistons 156 are slidably received by the through bores 155 of the guide 154. A guide 158 and a cylinder unit 159 having similar constructions to the guide 154 and cylinder unit 159 are mounted on the upper surface of the plate 151. Namely, the pistons 160 of the cylinder unit 159 are received by the through bores formed in the guide 158. A stopper 161 extends upwardly from the plate 151. A guide 162 is fixed through the plate 151. A plate 163 is slidably supported by the guide bars 128,144 through six guide bushes 164,165 fixed to the lower surface thereof. A flange 166 is fixed to the upper end of the guide bar 144 so as to take the position on the plate 163. A lever 167 is disposed on the upper surface of the plate 163 through a bracket 168 and a shaft 169, and is adapted to make contact with the upper surface of the flange 166 at its one end. A cylinder 170 is rotatably supported through a shaft 172 by a bracket 171 fixed to the lower surface of the plate 163. The cylinder 170 has a rod 173 which is rotatably connected to one end of the lever 167 through a joint 174 and a shaft 175. The arrangement is such that the lever 167 is brought into contact with the flange 166 by the operation of the cylinder 170 and, thereafter, the plate 163 is moved up and down in synchronism with the vertical movement of the plate 139. Then, as the lever 167 leaves the flange 166, the plate 163 is moved downwardly until it comes to contact with the stopper 161.

Figure 9:
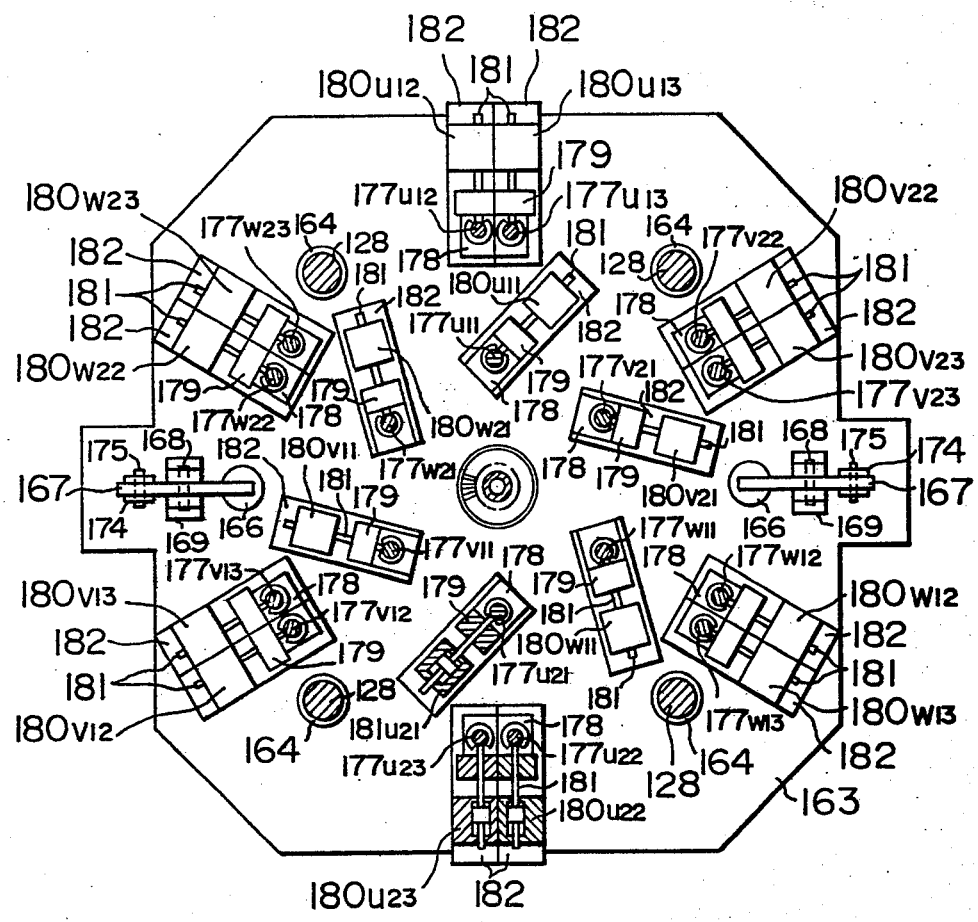
FIG. 9 is a sectional view of the selector unit taken along the line IX—IX.
Figure 10:
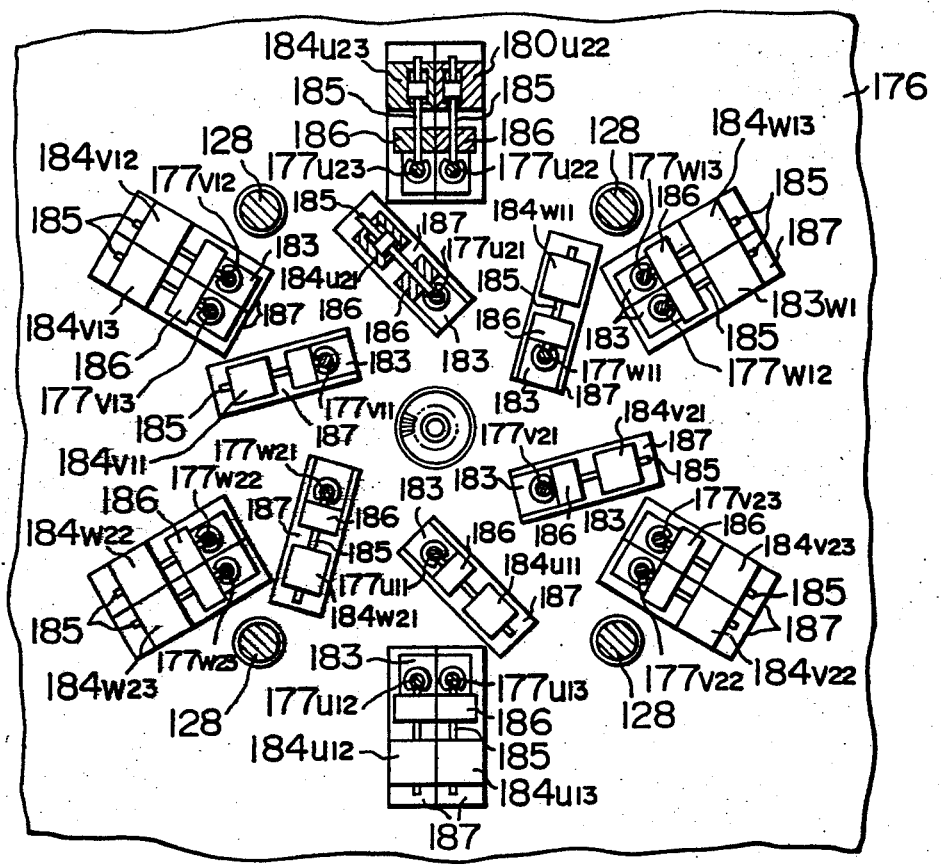
FIG. 10 is a sectional view of the selector unit taken along the line X—X.
Figure 11:
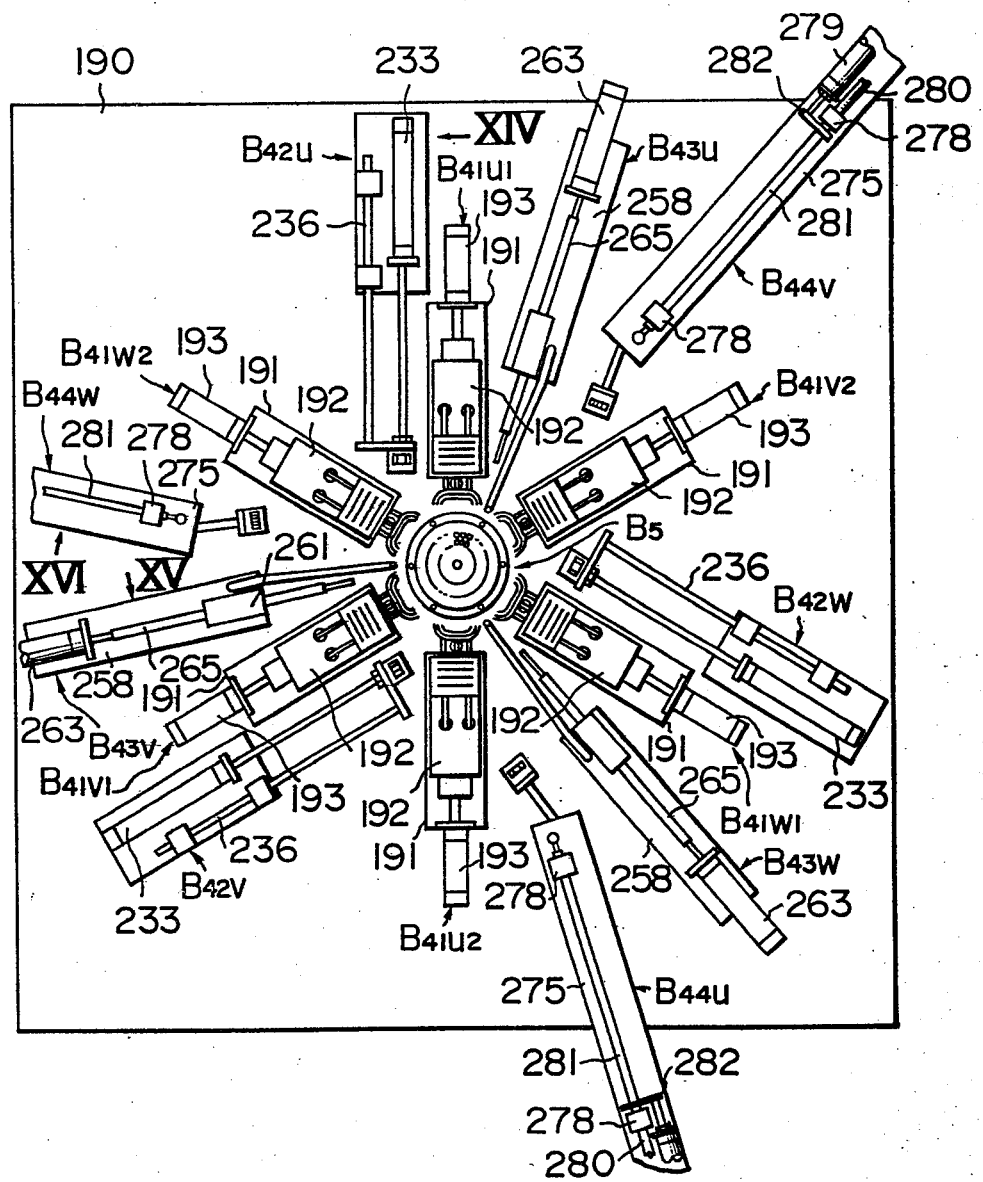
FIG. 11 is a plan view of an inserter as shown in FIG. 6.

As shown in FIGS. 6, 9 and 10, a second selector mechanism includes eighteen drive bars 177 (177$u$11, 177$u$12, 17$u$13, 17$u$21, 177$u$22, 177$u$23, 17$v$11, 177$v$12, 17$v$13, 177$v$21, 177$v$22, 177$v$23, 177$w$11, 177$w$12, 177$w$13, 177$w$21, 177$w$22, 177$w$23) adapted to selectively hold and drive up and down the auxiliary plates to form the winding forms which will be mentioned later. Each of the drive bars 177 are provided with notches a, b, c, d. These bars 177 extend through the plate 163 and a plate 176 which is fixed to the upper side of the beam 153.

Bushes 178 for guiding the drive bars 177, eighteen cylinders 180 (180$u$11, 180$u$12, 180$u$13, 180$u$21, 180$u$22, 180$u$23, 180$v$11, 180$v$12, 180$v$13, 180$v$21, 180$v$22, 180$v$23, 180$w$11, 180$w$12, 180$w$13, 180$w$21, 180$w$22, 180$w$23) and guides 179 for guiding the pistons 181 of the cylinders 180 are supported in units by respective bases 182 which are secured to the plate 163. Similarly, bushes 183 for guiding the drive bars 177, eighteen cylinders 184 (184$u$11, 184$u$12, 184$u$13, 184$u$21, 184$u$22, 184$u$23, 184$v$11, 184$v$12, 184$v$13, 184$v$21, 184$v$22, 184$v$23, 184$w$11, 184$w$12, 184$w$13, 184$w$21, 184$w$22, 184$w$23), and guides 186 for guiding pistons 185 of the cylinders 184 are supported in units by respective bases 187 which are secured to the lower surface of the plate 176. The pistons 181, 185 of the cylinders 180, 184 are adapted to engage the notches a, b, c, d of corresponding drive bars 177. When the plate 163 is raised while the pistons 181 of the cylinders 180 are in engagement with the notches d of the drive bars 177, the drive bars 177 are raised together with the plate 163. At the upper end of this upward stroke, the pistons 185 of the cylinders 184 are brought into engagement with the notches c of the drive bars 177 the pistons 181 are disengaged from the notches d, and then only the plate 163 is lowered while leaving the drive bars 177 at the upper end of the stroke. The drive bars 177 assume a stand-by position when the pistons 185 of the cylinders 184 engage the notches b of the drive bars 177. When the notches d are engaged by the pistons 185, the drive bars 177 set auxiliary plate 221 in winding stage. When the notches a are engaged by the pistons 185, the drive bars 177 are in such a state so as to keep maintain the coils of the first pole wound on winding forms at lowered position where the coils do not interfere the winding of coils of the second pole. It is possible to vertically drive and to hold any drive bars 177 by selectively operating the cylinders 180 and 184. The plate 176 is provided at its center with a hole 188 which receives the holder 51 of the wedge supplying means.

As shown in FIGS. 6 and 11–16, the top unit $B_4$, as a whole, is mounted on a plate 190 which is supported by posts 189 extending upwardly from the plate 176 of the selector unit $B_3$. The plate 190 carries 6 sets of auxiliary units B41 (B41$u$1, B41$u$2, B41$v$1, B41$v$2, B41$w$1, B41$w$2) for constituting winding forms, three sets of starting lead holder units B42 (B42$u$, B42$v$, B42$w$) adapted to hold the starting end leads of respective coils, crossover holder units B43 (B43u, B43v, B43w) for hitching the crossover between poles of respective phases, and three sets of end lead holder units B44 B44u, B44v, B44w adapted to hold the end leads of the coils.

Figure 12:
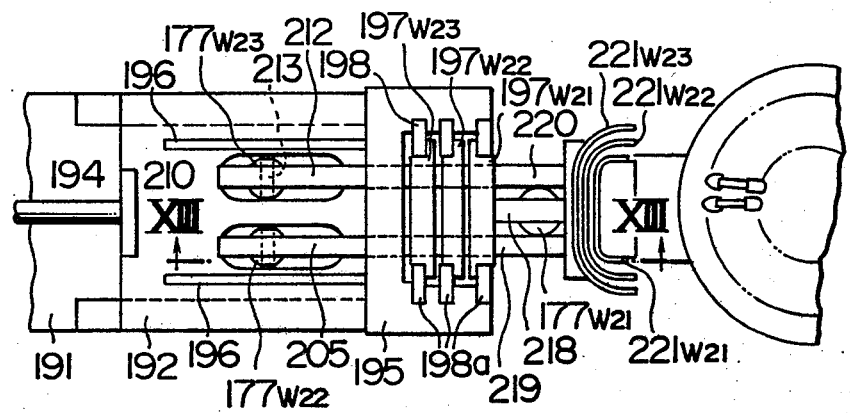
FIG. 12 is an enlarged view of an essential part of auxiliary unit as shown in FIG. 11.
Figure 13:
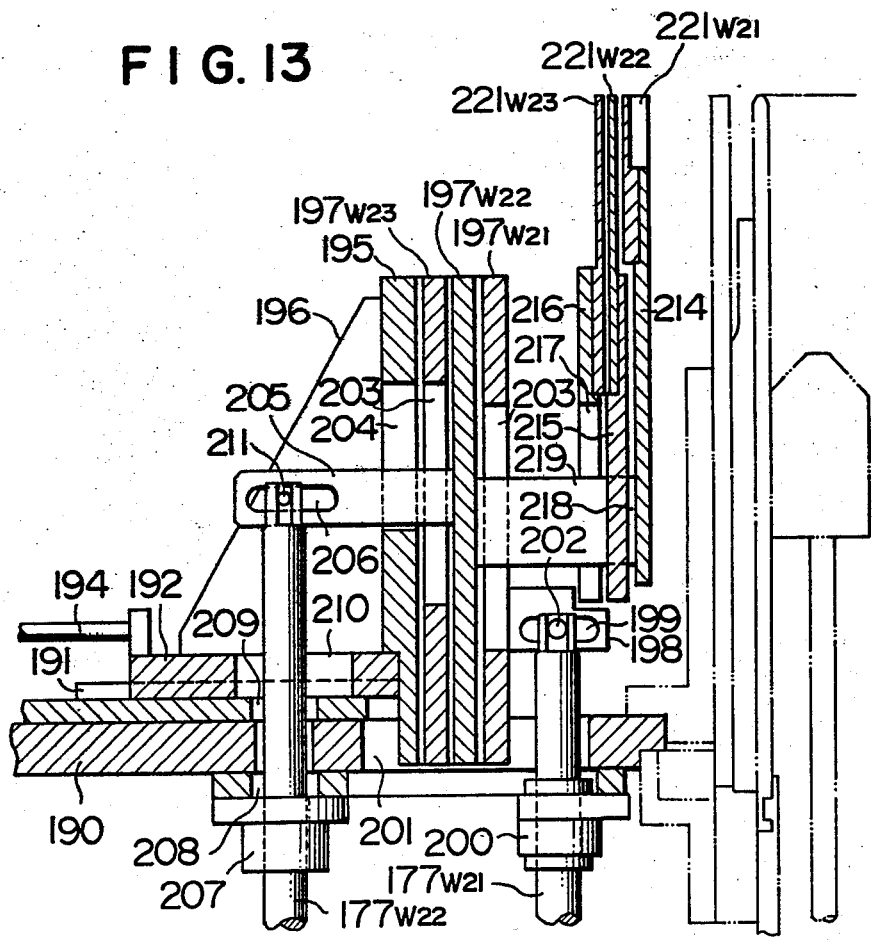
FIG. 13 is a sectional view taken along the line XIII—XIII of FIG. 12.
Figure 15:
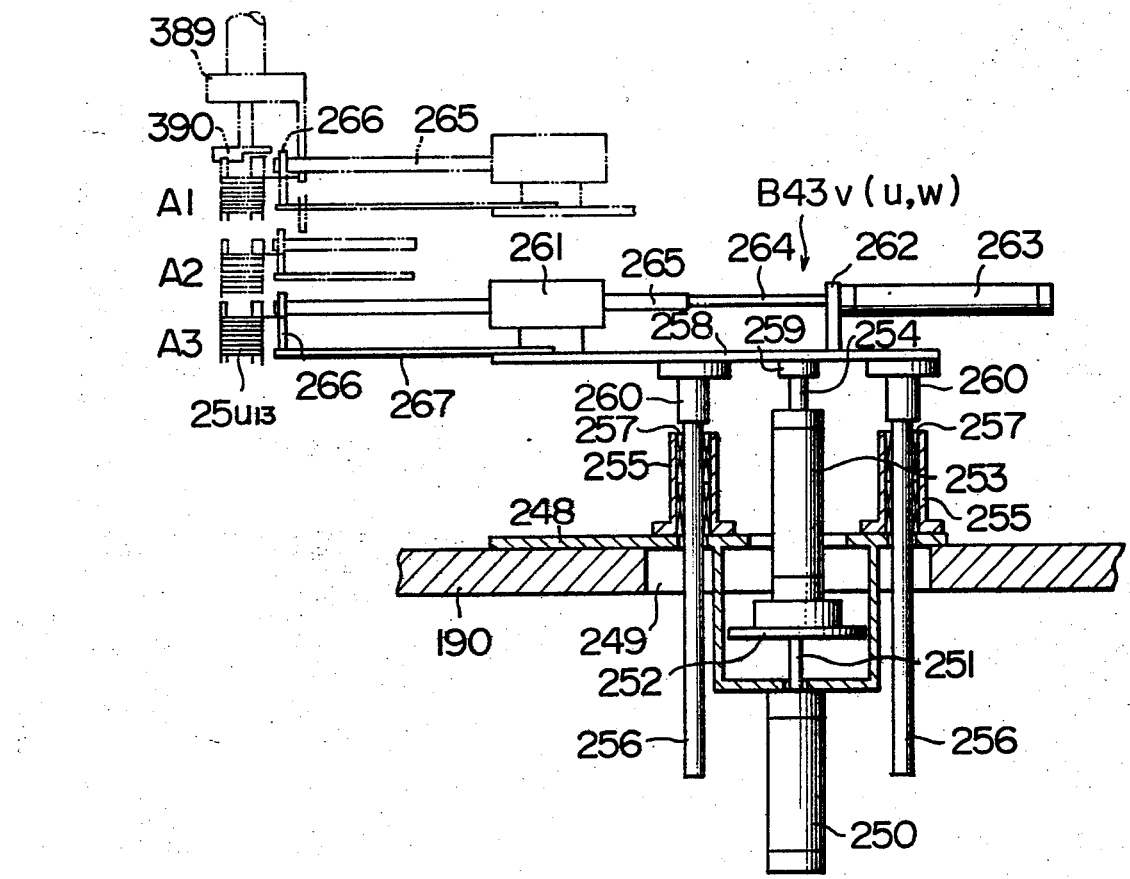
FIG. 15 is an illustration of a crossover holder unit shown in FIG. 11, as viewed in the direction of the arrow XV.

The construction of the auxiliary unit B41w2 will be described by way of example with specific reference to FIGS. 12 and 13, since other five auxiliary units have identical construction. However, it is to be noted, the auxiliary units B41u2, B41v2 and B41w2 are positioned at the opposite side of the auxiliary units B41u1, B41v1 and B41w1 to the tooling blades and spaced from the auxiliary units B41u1, B41v1 and B41w1 by a distance corresponding to the difference of circumferential coil length between the coils of the first and second poles. Alternatively, the positions of the auxiliary plates are differentiated.

A base 191 is fixed to the upper surface of the plate 190. A slider 192 slidably fits in the guide portion formed at the front end of the base 191, and is coupled to the end of the rod 194 of a cylinder 193 supported on the rear end of the base 191. A guide 195 extends upwardly from one end of the slider 192 and is reinforced by a rib 196. Liftable plates 197 (197w21, 197w22, 197w23) are vertically movable supported by the guide 195 through linear guides 198a. The liftable plate 197w21 has a projection 198 in which formed is an elongated hole 199. The drive bar 177w21 projects to the upper side of the plate 190 through a bush 200 secured to the lower side of the plate 190 and also through a hole 201 formed in the plate 190. The upper end of the drive bar 177w21 is connected to the projection 198 by means of a shaft 202 which is slidably received by the elongated hole 199.

The aforementioned liftable plate 197w22 is provided with a projection 205 which extends through an elongated hole 203 formed in the aforementioned liftable plate 197w23 and an elongated hole 204 formed in the guide 195. An elongated hole 206 is formed in one end of the projection 205. The aforementioned drive bar 177w22 slidably projects to the upper side of the slider 192 through a bush 207 secured to the lower side of the plate 190, a hole 208 formed in the plate 190, a hole 209 formed in the base 191 and then through a hole 210 formed in the slider 192. The upper end of the drive bar 177w22 is connected to the projection 205 by a shaft 211 which is slidably received by the elongated hole 206. Similarly, a projection 212 of the liftable plate 197w23 is connected to the drive bar 177w23 through a shaft 213. Therefore, the liftable plate 197w21 is moved up and down as the drive bar 177w21 is moved vertically. Similarly, the liftable plate 197w23 is moved vertically as the drive bar 177w23 moves up and down. The liftable plates 197 are slided slidably displaced as the slider 192 is slid by the operation of the cylinder 193. This sliding motion causes a change in the relative positions between the elongated holes 199,206 and the shafts 202,211,213. However, the liftable plates 197 are not moved up and down.

Three holders 214, 215, 216 are arranged to correspond to the liftable plates 197. The holder 214 is connected to the liftable plate 197w21 by an arm 218 which slidably extends through grooves 217 formed in the holders 215, 216. The holder 215 is connected to the liftable plate 197w22 by an arm 219 which slidably extends through the groove 217 formed in the holder 216 and an elongated hole 203 formed in the liftable plate 197w21. The holder 216 is connected to the liftable plate 197w23 by means of an arm 220 which extends through elongated slots 203 formed in the liftable plates 197w21, 197w22. Therefore, the holders 214, 215, 216 are moved up and down together with the liftable plates 197w21, 197w22, 197w23, respectively.

Auxiliary plates 221 (221w21, 221w22, 221w23) are fixed to the upper ends of the holders 214, 215, 216, respectively. Therefore, the auxiliary plates 221w21, 221w22 and 221w23 are moved up and down as the drive bars 177w21, 177w22 and 177w23 are vertically displaced.

Since the three starting lead holder units B42 have an identical construction, only the starting lead holder unit B42u will be described in detail. More particularly, as shown in FIG. 14, a. A bracket 222 is supported so as to extend through a hole 223 formed in the plate 190. A cylinder 224 is secured to the lower side of the bracket 222, and has a rod 225 which extends through the bracket 222 and the plate 190. Guide bushes 226 are attached to the lower side of the bracket 222 at both sides of the cylinder 224. A pair of guide bars 227 are slidably received by the guide bushes 226 through linear bearings 228. A base 229 is connected to the upper end of the guide bars 227 and also to the upper end of the rod 225 with holders 230. Therefore, the base 229 is moved up and down as the cylinder 224 operates. The vertical movement of the base 229 is followed by the vertical movement of the guide bars 227. A bracket 231 and a guide 232 are fixed to the base 229. A cylinder 233 is fixed to the bracket 231 and has a rod 234 which extends through the bracket 231. A guide bar 235 slidably extends through the bracket 231. A guide bar 236 extends slidably through the bracket 231 and the guide 232. A base 237 is fixed to the end of the rod 234 of the cylinder 233 and also to the ends of the guide bars 235 and 236. The base, therefore is moved in the horizontal direction as the cylinder 233 operates. A cylinder 238 is rotatably supported through a shaft 240 by a bracket 239 projected from the end surface of the base 237. The cylinder 238 has a rod 241 which is directed upwardly. A bracket 242 is fixed to the cylinder 238 and is connected to the base 237 through a spring 243. A pair of fingers 244 are rotatably supported by a pair of shafts 245 which are provided on the end of the bracket 242 at a predetermined distance from each other. A pair of links 246 are rotatably connected at their one ends to the rod 241 through joints 247 and rotatably connected at their other ends to the rear ends of the fingers 244. Therefore, the ends of the fingers 244 are moved toward and away from each other as the cylinder 238 operates, thereby clamping and releasing the starting lead of the coil. The fingers 244 holding the starting lead of the coil are adapted to be retracted, so that an excessively large tension may occur in the wire. The wire, however, is relieved from such an excessively large tension by the spring 243 which is stretched to absorb such a tension.

Since the three crossover hold units B43 have identical constructions, only the crossover hold unit B43v will be described in detail. More particularly, referring to FIG. 15, a bracket 248 is supported by the upper surface of the plate 190 and extends through a hole 249 formed in the plate 190. A cylinder 250 is secured to the lower end of the bracket 248 and has a rod 251 which extends through the bottom portion of the bracket 248. A vertically movable block 252 is disposed in the bracket 248 and is connected to the rod 251 of the cylinder 250. A cylinder 253 fixed to the block 252, has an upwardly directed rod 254. A pair of guide bushes 255 are supported by the bracket 248, while a pair of guide bars 256 are slidably received by the guide bushes 255 through linear bearings 257. A base 258 is connected to the upper end of the guide bars 256, through an abutment plate 259 secured to the lower side thereof and through bushes 260. Therefore, as the cylinder 250 is operated to move its rod 251 up and down, the base 258 is moved up and down through the medium of the block 252, cylinder 253 and the rod 254 of the latter, by a distance corresponding to the stroke of the rod 251. Also, as the cylinder 253 operates, the base 258 is moved up and down by a distance corresponding to the stroke of the rod 254 of the cylinder 253. Namely, the base 258 is reciprocated between three positions. A guide 261 and a bracket 262 are fixed to the upper side of the base 258. A cylinder 263 fixed to the bracket 262 has a rod 264 which extends through the bracket 262 to project therefrom to the side adjacent to the guide 261. A hook pin 265 is slidably engaged by the guide 261 and is connected at its rear end to the rod 264 of the cylinder 263. A hook pin 266 is protruded from an arm 267 which is fixed to the said base 258. The hook pin 266 is disposed within the circle of rotation of flyers which will be explained later. The hook pin 266, however, assumes a stand-by position defined below the above-mentioned circle during the winding operation, so as not to impede the operation of the flyers. In operation, the hook pins 265 and 266 cooperate with each other in limiting the position of passage of the crossover wire.

Figure 16:
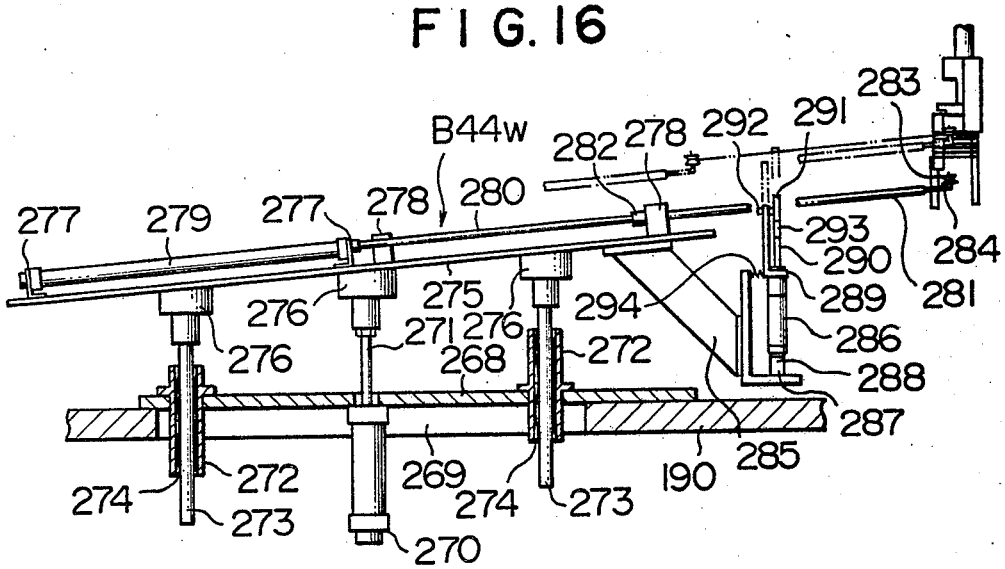
FIG. 16 is an illustration of an end lead holding unit shown in FIG. 11 as viewed in the direction of the arrow XVI.
Figure 17:
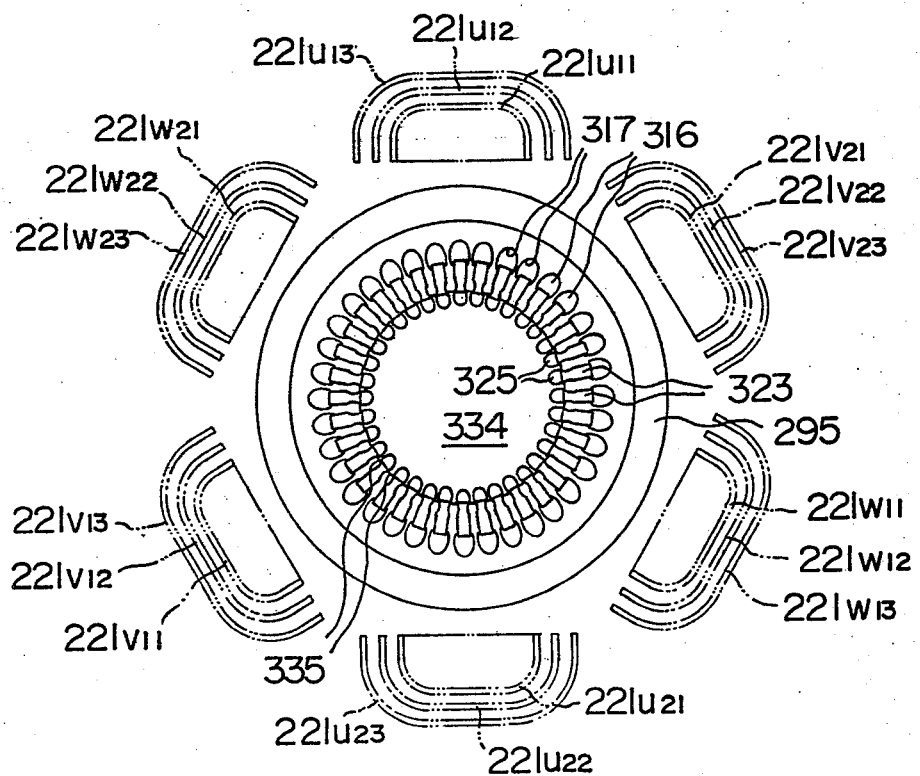
FIG. 17 is a plan view of an insertion unit as shown in FIG. 11.
Figure 18:
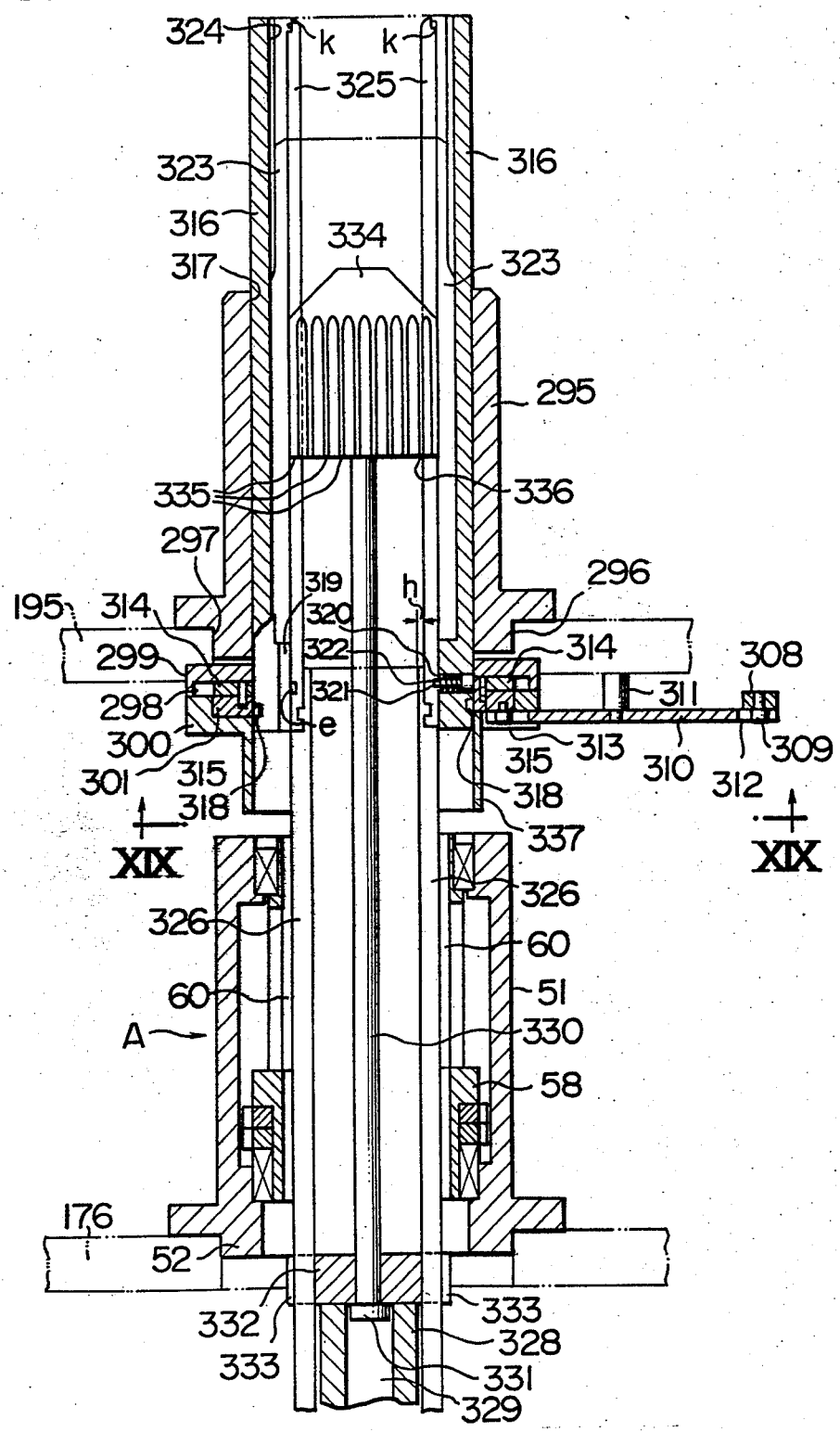
FIG. 18 is a front elevational view of the insertion unit as shown in FIG. 17.
Figure 19:
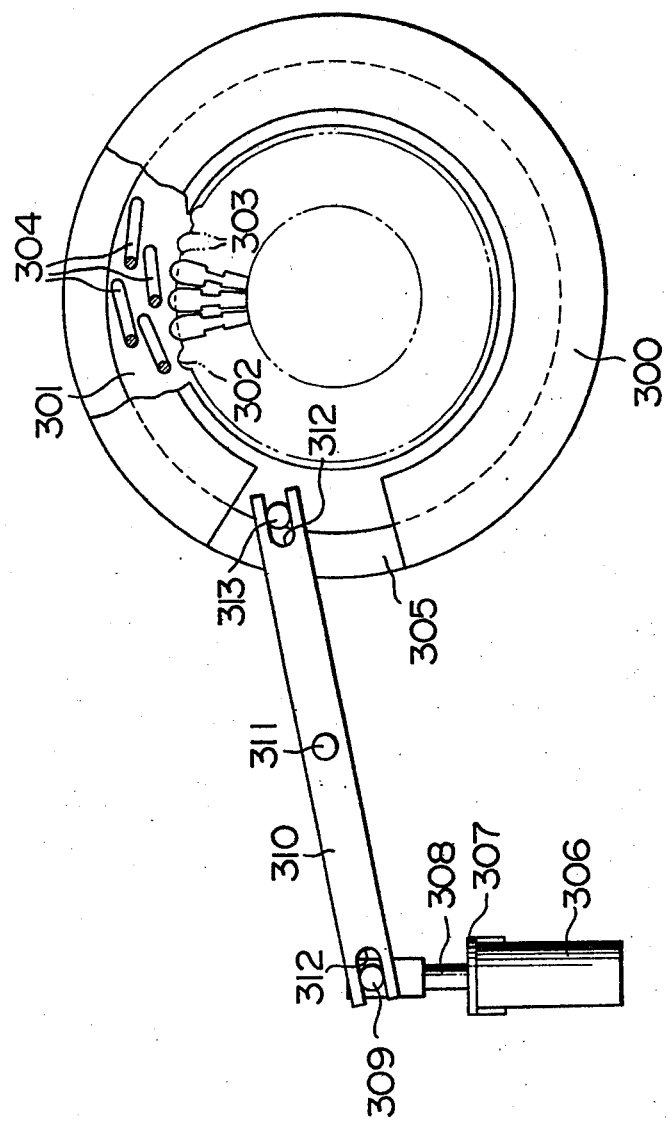
FIG. 19 is a sectional view taken along the line XIX—XIX of FIG. 18.
Figure 20:
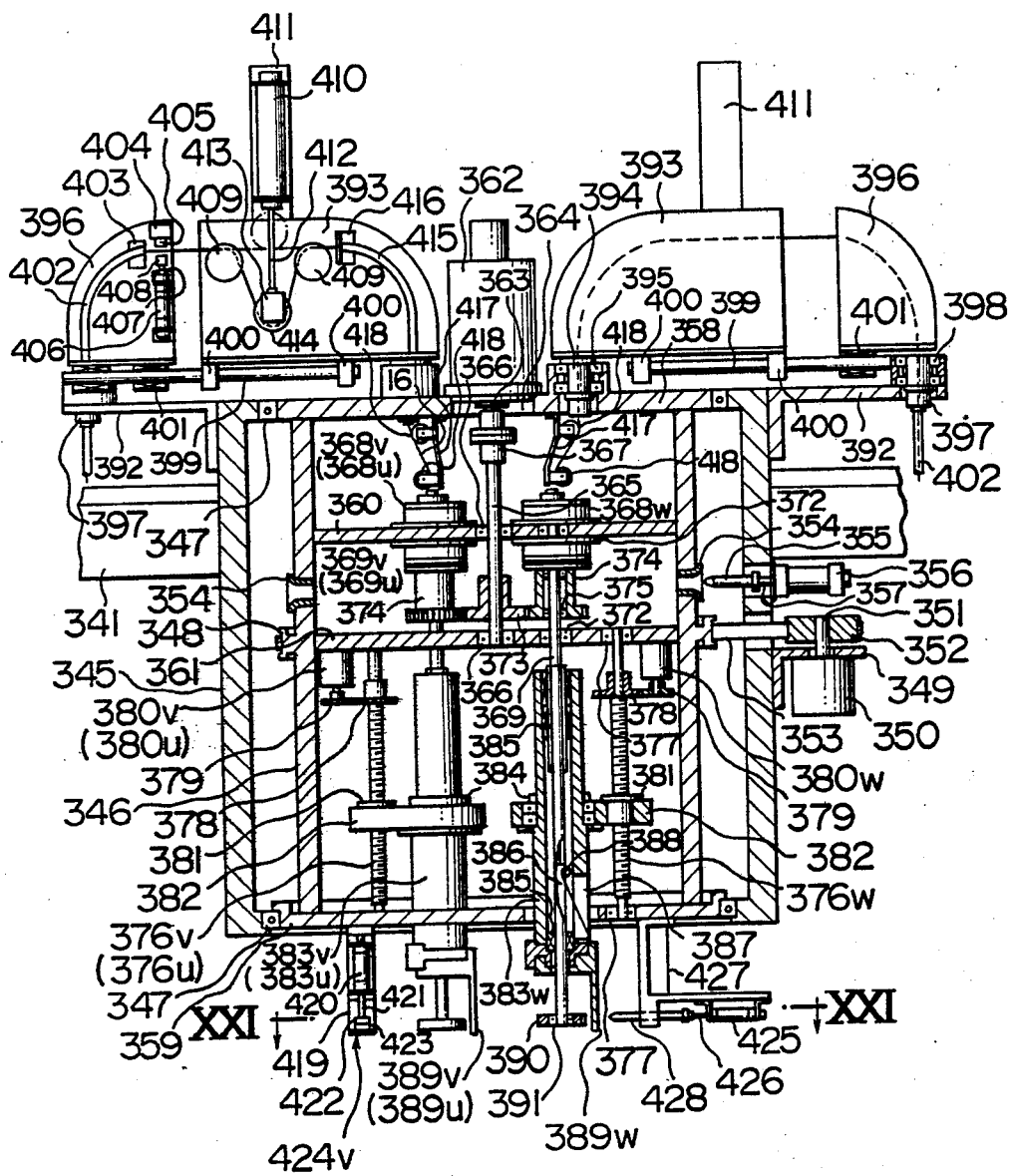
FIG. 20 is a front elevational sectional view of winding means incorporated in the machine shown in FIG. 1.
Figure 21:
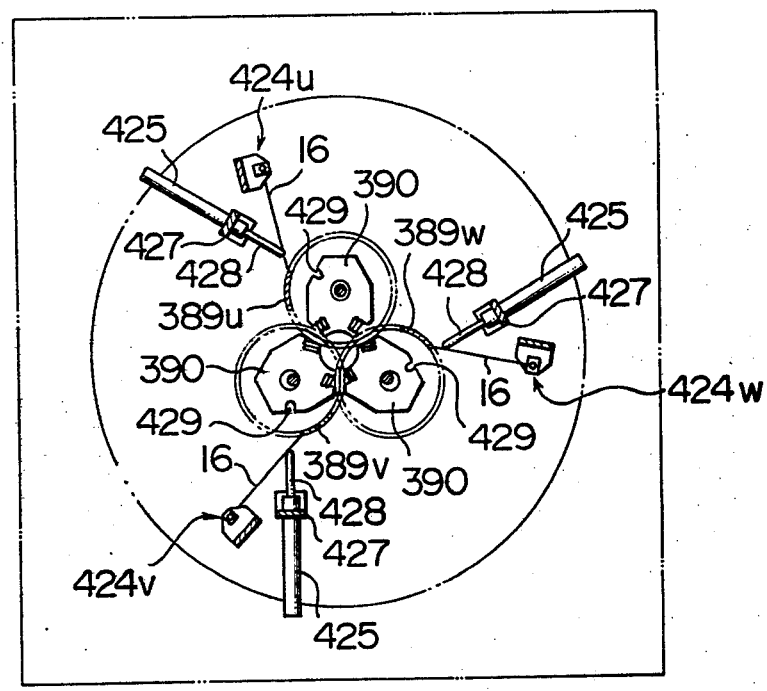
FIG. 21 is a sectional view taken along the line XXI—XXI of FIG. 20.
Figure 22:
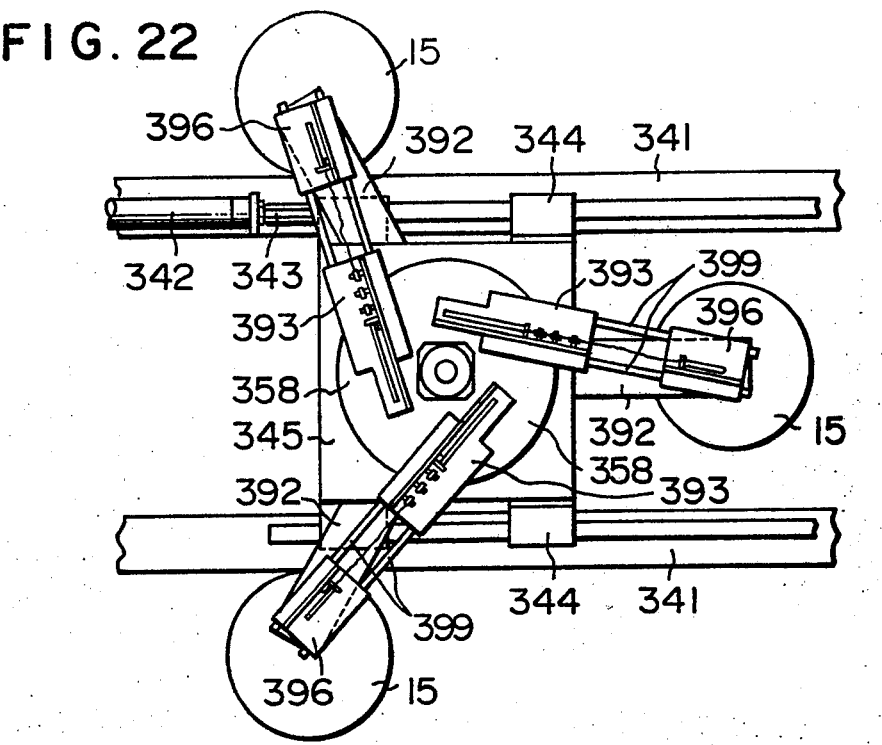
FIG. 22 is a plan view of the winding means as shown in FIG. 20.

Since the three end lead holder units B44 are of identical constructions, only the end head holder unit B44w will be described in connection with FIG. 16. More particularly, as shown in FIG. 16, a bracket 268 is fixed to the upper side of the plate 190 so as to cover the upper end of a hole 269 formed in the plate 190. A cylinder 270 is fixed to the lower side of the bracket 268 and has a rod 271 which extends upwardly through the bracket 268. A pair of guide bushes 272 are fixed to the bracket 268. A pair of guide bars 273 extend slidably through the guide bushes 272 through the medium of linear bearings 274. A base 275 is connected to the rod 271 of the cylinder 270 and the guide bars 273 through three holders 276 secured to the lower side thereof, and is inclined with respect to the plate 190 at a predetermined angle.

Therefore, as the cylinder 270 is operated to drive the rod 271 up and down, the base 275 is moved vertically while maintaining a inclined position. A pair of brackets 277 and two guides 278 are secured to the base 275. A cylinder 279 fixed between the brackets 277, has a rod 280 projected toward the guides 278. An extension bar 281 extends slidably through the guides 278 and is connected at its central portion to the end of the rod 280 through a joint 282. A roller 283 is rotatably supported by the end of the extension bar 281 through a support shaft 284. Therefore, the roller 283 is moved back and forth in accordance with the operation of the cylinder 279. A bracket 285 is fixed to the lower side of the end portion of the base 275. A cylinder 286 is rotatably supported by the projection 287 of the bracket 285 through a shaft 288. A bracket 289 is fixed to the cylinder 286 and extends in parallel with the rod 290 of the cylinder 286. A pair of fingers 291 are rotatably supported by a shaft 292 which is provided an the upper ends of the base 289. The fingers 291 are rotatably connected at their rear ends to the rod 290 of the cylinder 286 through links 293. A spring 294 is stretched between the brackets 285 and the bracket 289. As the cylinder 286 operates, the free ends of the fingers 291 are moved toward and away from each other to clamp and release the end lead of the coil. When the free ends of the fingers 291 are positioned remote from each other, the roller 283 moves through the clearance between the ends of the fingers 291 to pull the end lead of the coil, so that the end lead of the coil is held by the fingers 291 as the free ends of the fingers 291 are brought together. When an excessively large tension occurs in the end lead of the coil, the spring 294 is stretched to permit the cylinder 286 to rotate; to thereby relieve the end lead of the coil from such an excessively large tension.

As shown in FIGS. 6 and 17-19, the insertion unit B5 includes a blade guide 295 secured to the plate 190 in such a manner that a projection 296, formed at the lower end of the blade guide 295, is received by a hole 297 formed at the center of the plate 190. A guide plate 299 having thirty-six radial grooves formed in the lower surface thereof is fixed to the lower side of the plate 190 together with a cam holder 300. A disc-shaped cam 301 is rotatably received by the cam holder 300. As will be explained later, the cam 301 is provided in its inner peripheral surface with thirty-six grooves 302 adapted to engage back-up blades which will be mentioned later. The inner peripheral surface of the cam 301 is provided also with thirty-six projections 303 adapted to fit in the grooves of the back-up blades. The grooves 302 and the projections 303 are formed alternatingly. There are thirty-six elongated holes 304 formed in the cam 301. The cam case 300 is provided with a notch 305. A cylinder 306 is fixed to the lower side of the plate 190 through a bracket 307 and has a rod 308 which is provided at its one end with a pin 309. A lever 310 is rotatably supported at its center by a shaft 311 secured to the lower surface of the plate 190.

The lever 310 is provided at its both ends with grooves 312 one of which slidably engages the pin 309 while the other slidably engages with a pin 313 provided on the cam 301. The arrangement is such that the lever 310 is rocked to rotate the cam 301 as the cylinder 306 operates. There are thirty-six sliders 314 which are slidably received by corresponding grooves 298 of the guide plate 299. The sliders 314 are provided with pins projecting from the lower surfaces thereof. These pins 315 are received by corresponding elongated holes 304 in the cam 301 slidably. Therefore, as the cam 301 rotates, the sliders 314 are slid in the radial direction. Among the thirty-six back-up blades 316, the thirty-three back-up blades other than three back-up blades located at the center of the blade around which the coils of the first pole are wound are slidably received by corresponding ones of thirty-six grooves formed in the blade guide 295. The above-mentioned three back-up blades 316 have a length greater than the other back-up blades 316. These three back-up blades are supported by the blade guide 295 such that the lower ends thereof oppose the magazine 58 at a predetermined distance. The back-up blades 316 are provided at their lower end portions with grooves 318 for receiving projections 303 of the cam 301 and grooves 319 adapted to permit the wedges to pass therethrough, as well as holes 320 formed at positions confronting the sliders 314. The holes 320 slidably receive pins 321 and the springs 322. There are thirty-six wedge guides 323 slidably fit in the grooves 324 which are formed in the inner side of the back-up blades 316. Also, there are provided thirty-six tooling blades 325 each of which has a notch k formed in the upper end peripheral surface thereof. A notch e formed at the outer side of lower end of each tooling blade 325 is adapted to be engaged by the end of the pin 321 received by the hole 320 in the back-up blade 316. There are provided also 36 connecting bars 326 each of which is connected to the lower end of corresponding one of the tooling blades 325. The connecting bars 326 extend through the wedge magazine 58, plate 176 and the plate 163. A drive bar 327 is connected to the lower end of each of the connecting bars 326. Thus, there are thirty-six drive bars 327 in all. These drive bars 327 extend slidably through the plates 151, 146, 139. Each of the drive bars 327 is provided at its upper portion with notches f, g and i adapted to be engaged by the piston 160 of the cylinder 159 of the selector unit $B_3$ and at its lower portion with a notch j adapted to be engaged by the piston 156 of the cylinder 157. The notch f serves for holding the coil wound round the tooling blade 325 at the stand-by position, while the notch g is intended for holding the tooling blade 325 at the stand-by position before the winding. The notch i is provided for holding the tooling blade 325 at the winding position. Finally, the lower notch j is provided for moving the tooling blade 325 up and down.

As the plate 139 is moved vertically while the piston 156 is in engagement with the notch j of the drive bar 327, the tooling blade 325 is moed vertically. When the notch g of the drive bar 327 is engaged by the piston 160, the tooling blade 325 takes a stand-by position preparing for the start of operation of the coil winding and insertion machine. Also, when the piston 160 engages the notch i of the drive bar 327, the tooling blade 325 takes the winding position. Furthermore, when the notch f of the drive bar 327 is engaged by the piston 160, the tooling blade 325 is lowered to a level where the back-up blades 316 oppose to the upper end surface of the magazine 58 of the wedge supplying means A with a small gap left therebetween, so as to lower the coils of the first pole, wound round the tooling blades 325, to such a position so as not to impede the coil winding operation for the second pole. The selection of the tooling blades 325 to be lifted and lowered from the thirty-six tooling blades 325 is made by the cylinders 157 and 159 which are operated in accordance with a predetermined sequence. A drive shaft 328 is disposed at the center of the circle formed by the thirty-six drive bars 327. The drive shaft 328 is connected to the upper end of the rod 136 of the cylinder 135 in the drive unit $B_2$. A hole 329 formed at the upper end of the drive shaft 328 slidably receives a flange 331 fixed to the lower end of an insertion bar 330. A wedge pusher 332 slidably fits the shaft portion of the insertion bar 330 and is fixed to the upper end of the drive shaft 328. The wedge pusher 332 is provided with thirty-six projections 333 slidably fitting in the spaces between adjacent connecting bars 326 and further projecting outwardly. The projections 333 oppose to the guide grooves 60 formed in the magazine 58 of the wedge supplying means A. Therefore, as the drive shaft 328 is raised, the wedge pusher 332 is also raised so that the projections 333 are moved through the grooves 60 of the magazine 58 to thereby force out the wedges from the grooves 60 toward the wedge guides 323. The wedges are then forced into the slots of the stator core as will be explained later. The central portion of the wedge pusher 323 opposes to the flange 331 of the insertion bar 330 so as to serve to prevent the insertion bar 330 from coming off. A stripper 334 is fixed to the upper end of the insertion bar 330. The stripper 334 is provided with thirty-six projections 335 which are slidably received by the spaces between adjacent tooling blades 325. Several radial grooves are formed in the lower surface of the stripper 334. These grooves are adapted to be engaged by pins 336 provided on some of the tooling blades 325. The pins 336 have a length smaller than the difference of height h between the tooling bar 325 and the connecting bar 326. Thus, the stripper 334 is supported by the pins 336. For inserting the coils into the slots of the stator core, the cylinder 135 operates to lift the drive shaft 328 to thereby raise the wedges by the wedge pusher 332 and further to bring the wedge pusher 332 into contact with the lower end surface of the stripper 334 to raise the stripper 334 to a predetermined level. Then, after the insertion, the cylinder 135 is operated to lower the drive shaft 328 to thereby make the wedge pusher 332 lower the flange 331 fixed to the lower and of the insertion bar 330. Consequently, the stripper 334 is withdrawn from the stator core. A cylindrical stopper 337 is provided for preventing the pins 321 from coming off when the back-up blades 316 are moved to the lower side of the blade guide 295.

The inserter B having the described construction operates in a manner explained hereinunder. Namely, the cylinder 126 is operated to extend its rod 127 while the cylinder 149 acts to position the stopper 147 so as to oppose to the rod 143. On the other hand, the cylinders 135 and 137 take stand-by positions with their rods 136, 138 retracted. Meanwhile, the piston 160 of the cylinder 159 engages the notch g of the drive bar 327, while the piston 185 of the cylinder 184 is in engagement with the notch b of the drive bar 327. The cylinder 170 is activated to couple the plate 163 to the guide bar 144, while the cylinder 193 retracts its rod 194. The inserter B is thus ready for operation.

Then, cylinders 180$u$11, 180$v$11 and 180$w$11 are activated to extend their pistons 181 into engagement with the notches of the drive bars 177$u$11, 177$v$11 and 177$w$11. Then, the six pistons 156 of the cylinder unit 157 previously determined corresponding to the cylinders 180$u$11, 180$v$11 and 180$w$11 are brought into engagement with the notches j of the drive bars 327. Then, the cylinders 184$u$11, 184$v$11 and 184$w$11 are operated to withdraw respective pistons 185 from the notches b of the drive bars 177$u$11, 177$v$11 and 177$w$11. At the same time, six pistons 160 of the cylinder unit 159 corresponding to the six pistons 156 of the cylinder unit 157 are disengaged from the notches g of the drive bars 327. Subsequently, the cylinder 137 is operated to raise the plate 139 until the rod 143 comes into contact with the stopper 147. Consequently, the plate 163 is also raised through the medium of the guide bar 144, so that the drive bars 177$u$11, 177$v$11, 177$w$11 are moved upward together with the guide bars 327. As a result, the notches c of the drive bars 177$u$11, 177$v$11, 177$w$11 are brought to positions confronted by the pistons 185 of the cylinders 184$u$11, 184$v$11 and 184$w$11. Similarly, the notches i of the raised six drive bars 327 are confronted by the pistons 160 of the cylinder 159. Then, the cylinders 184$u$11, 184$v$11 and 184$w$11, as well as the cylinder 159, are operated to bring respective pistons 185 and 160 into engagement with the notches c and i, respectively. Thereafter, the cylinders 180$u$11, 180$v$11 and 180$w$11, as well as the cylinder 157, are activated so that the pistons 181 and the pistons 156 corresponding to the raised six drive bars 327 are disengaged from the notches d and j, respectively. Subsequently, the cylinder 137 is activated to lower the plates 139 and 163. The auxiliary plates 221u11, 221v11 and 221w11 thus raised by the drive bars 177u11, 177v11 and 177w11, constitute, in combination with pairs of tooling blades 325 corresponding to each auxiliary plate, three winding forms for coils corresponding to the first coils of first pole of the three phases u, v and w. As coils are formed on respective winding forms, the operation described heretofore is repeated to form the winding forms for the second coils and third coils, successively, and coils are wound around these winding forms. As the coil winding of the first pole is completed, the cylinder 137 is operated to lift the plates 129 and 163 so that the pistons 156 of the cylinder unit 157 are made to oppose to the notches j of the drive bar 327 of the tooling blades 325 which have been raised for the coil winding. At the same time, the pistons 181 of the cylinders 180u11, 180u12, 180u13, 180v11, 180v12, 180v13, 180w11, 180w12, 180w13 are made to oppose to the notches d of the drive bars 177u11, 177u12, 177u13, 177v11, 177v12, 177v13, 177w11, 177w12, 177w13 corresponding to the auxiliary plates 221u11, 221u12, 221u13, 221v11, 221v12, 221v13, 221w11, 221w12, 221w13, respectively. After bringing the pistons 156 and 181 into engagement with the notches j and d, all of the pistons 160 and 185 engaging with the notches c and i are disengaged from these notches. The cylinder 137 is activated in this state, to thereby lower the plate 139 until the stoppers 142 are stopped by the plate 129. Thereafter, all pistons 156 of the cylinder 157 are brought into engagement with all notches j of the drive bars 327, while all pistons 160 engaging the notch g are retracted from the latter. Then, the cylinder 126 is activated to lower the plate 129 until the stoppers 132 are stopped by the base 123. Thereafter, the plates 139 and 163 are lowered so that all tooling blades 325, wedge guides 323, back-up blades 316 and auxiliary plates 221u11, 221u12, 221u13, 221v11, 221v12, 221v13, 221w11, 221w12, 221w13 are lowered to the positions where the notches a and f of the drive bars 327 and 177 are opposed by the pistons 160 and 185, respectively. In this state, the back-up blades 316 oppose the magazine 58 with a small gap therebetween. The gas is, for example, as small as less than 1 mm. Then, the cylinder 135 is operated to raise the wedge pusher 332, so that the wedges in the magazine 58 are transferred into the wedge guides 323. Meanwhile, the amount of operation of the cylinder 135 is detected by a suitable detecting means (not shown) and is stopped at a point intermediate the entire stroke. Then, the cylinders 184u11, 184u12, 184u13, 184v11, 184v12, 184v13, 184w11, 184w12, 184w13 are activated to extend their pistons 185 into the notches of the drive bars 177u11, 177u12, 177u13, 177v11, 177v12, 177v13, 177w11, 177w12, 177w13 while the pistons 181 of the cylinders 180 corresponding thereto are disengaged from the notches d. At the same time, the pistons 160 of the cylinder 159, corresponding to the tooling blades 325 which are unnecessary for winding coils of the second pole, are operated to engage the notches f of the drive bars 327. Simultaneously, the pistons 156 of the cylinders 157 are disengaged from the notches j of the drive bars 327. Then, the cylinder 193 is operated to move the auxiliary plates 221u11, 221u12, 221u13, 221v11, 221v12, 221v13, 221w11, 221w12, 221w13 to positions closer to the tooling blades 325. The cylinders 126 are activated in this state to lift the plates 129, 139, 163. As a result, the tooling blades 325 which are not engaged by the pistons 160 of the cylinder 159 are reset to the initial level. The coil winding is made in this state for the second pole, in the same manner as the coil winding for the first pole. After winding all coils, the cylinder 137 is activated to lower the tooling blades 325 around which the coils of the second pole are wound, as well as the auxiliary plates 221u21, 221u22, 221u23, 221v21, 221v22, 221v23, 221w21, 221w22, 221w23, are lowered. In consequence, the pistons 160 of the cylinder 159, and the pistons 185 of the cylinders 184u21, 184u22, 184u23, 184v21, 184v22, 184v23, 184w21, 184w22, 184w23 are brought into engagement with the notches g and b of the drive bars 327 and 177, respectively. Meanwhile, the pistons 156 of the cylinder 157 and the pistons 181 of the cylinders 180u21, 180u22, 180u23, 180v21, 180v22, 180v23, 180w21, 180w22, 180w23 are disengaged from the notches j and d of the drive bars 327 and 177, respectively. Subsequently, the cylinders 126 are activated to lower the plates 129, 139, 163 and, thereafter, the notches d and j of the drive bars 177 and 327 positioned at the lower end of the stroke are engaged by the pistons 156 and 181 confronting these notches. Then, the cylinders 126 are activated to lift the plates 129, 139 and 163 to align all auxiliary plates 221 and the tooling blades 325 in the heightwise direction. By a subsequent operation of the cylinders 193, the auxiliary plates 221u21, 221u22, 221u23, 221v21, 221v22, 221v23, 221w21, 221w22, 221w23 are moved toward the tooling blades 325. At the same time, the cylinders 149 are activated to retract the stoppers 147 from the position above the rod 143. On the other hand, all of the pistons 185 of the cylinders 184 are brought into engagement with the notches b of all drive bars 177, and all pistons 156 of the cylinder 157 are made to engage the notches j of the drive bars 327. Meanwhile, all pistons 160 of the cylinder 159 are disengaged from the notches g of the drive bars 327. The cylinders 170 are operated in this state to release the connection between the guide bars 144 and the plate 163. Consequently, the plate 163 is lowered until it is stopped by the stoppers 161, and the guide bars 144 project to the upper side of the surface plate 163. Furthermore, the cylinder 306 is activated to make the projections 303 of the cam 301 project into the grooves 318 in the back-up blades 316. At the same time, the sliders 314 are retracted through the elongated holes 304 to thereby move the pins 321 backward to disconnect the back-up blades 316 from the tooling blades 325. The cylinders 137 are activated in this state to lift the plate 139 so that the tooling blades 325 are raised to the insertion position above the winding position. If the stator core is disposed at the insertion position at this moment, the tooling blades 325 are made to fit in the inner periphery of the stator core such that the ends of the tooling blades extend through and project above the stator core. In this state, the cylinder 135 which has been stopped at an intermediate position in its stroke is started again to lift the wedges and the stripper 334 by the wedge pusher 332, so that the coils and wedges are inserted into the slots of the stator core. After the insertion, the cylinders 135 and 137 are activated to lower the tooling blades 325 and the wedge pusher 332, to thereby complete the winding and insertion of the coils.

The winding means C is slidably mounted on rails 341 placed on the supporting posts 340 and is connected to a rod 343 of a cylinder 342 placed on the rails 341, as will be seen from FIG. 1.

The winding means C, as shown in FIGS. 1, and 20-23, is reciprocated between a winding position shown by full line and a stand-by position shown by two-dots-and-dash line in FIG. 1, by the operation of the cylinder 342. The winding means C as a whole is supported by brackets 344 which are slidably mounted on the rails 341. A housing 345 is connected to the bracket 344. A drum 346 is rotatably attached to the center of the housing 345 through the medium of a pair of bearings 347. A pulley 348 is formed at the center of the outer peripheral surface of the drum 346. A motor 350 is supported by the outer surface of the housing 345 by means of a bracket 349. The motor 350 has a shaft 351 carrying a pulley 352. A belt 353 is wound around and stretched between the pulleys 348 and 352. Therefore, as the motor 350 operates, the drum 346 is rotated through the pulleys and the belt. A pair of bushes 354 are attached to the drum 346. A stopper 355 is connected to the rod 357 of a cylinder 356 which is fixed to the outer surface of the housing 345. The stopper 355 is adapted to engage either one of the bushes 354 by the operation of the cylinder 356, to thereby index the drum 346. Plates 358 and 359 are secured to the drum 346 so as to cover the upper and lower openings of the drum 346. Also, the space within the drum 346 is divided by plates 360 and 361 fixed to the drum 346. A motor 362 is carried by the plate 358 and has a shaft 363 which extends into the drum 346 through a hole 364 formed in the plate 358. A drive shaft 365 is rotatably carried by bearings 366 fixed to the plates 360 and 361, and is connected to the shaft 363 through a coupling 367. Three electromagnetic clutch brake units 368u, 368v, 368w are arranged at 120° interval around the drive shaft 365 and are fixed to the aforementioned plate 360. Hollow shafts 369u, 369v and 369w are rotatably supported by means of bearings 372 fixed to the plates 360 and 361, and are connected at their one ends to corresponding electromagnetic clutch brake units 368. A gear 373 fixed to the drive shaft 365 meshes with three gears 374 which are rotatably fitted around shafts 369u, 369v and 369w through respective bearings 375. The gears 374 are connected to the electromagnetic clutch brake units 368. Therefore, three gears 374 rotate simultaneously in the same direction as the gear 373 is driven by the motor 362. During the rotation of the gears, the electromagnetic clutch brake units 368 function as brakes so that the shafts 369 are not rotated if the clutches are in the "off" state. If the brake of the electromagnetic clutch brake unit 368 is turned off while the clutch of the same is turned on, the shaft 369 is rotated in synchronism with the rotation of the drive shaft 365. It is, therefore, possible to rotate or stop the shafts 369u, 369v and 369w as desired by switching the state of the electromagnetic clutch brake units 368. Three feed screws 376 (376u, 376v, 376w) are rotatably supported by bearings 377 which are fixed to the surface plates 361 and 359. A gear 378 is fixed to the upper end of each feed screw 376. A gear 379 meshing with each gear 378 is fixed to the shaft of a motor 380 secured to the lower surface of the plate 361. Thus, there are three motors 380. A vertically movable block 382 is connected to each feed screw 376 through a nut 381 engaging the feed screw 376. Thus, there are provided three blocks 372. Three flyer shafts 383 (383u, 383v, 383w) are rotatably secured to the blocks 382 through bearings 384 and are slidably fitted around the shafts 369 through linear bearings 385, respectively. Therefore, the flyer shafts 369 are rotated as the shafts 369 are rotated, so that the feed screws 369 are rotated to cause axial movement of the flyer shafts 383 together with the blocks 382. The shafts 369 and the flyer shafts 383 are provided with elongated holes 386 and 387 which extend in parallel with the axes of these shafts, respectively. A guide roller 388 is rotatably secured to one end of the elongated hole 386. Each flyer 389 (389u, 389v, 389w) is fixed to the lower ends of respective flyer shafts 383. Blade supports 390 are rotatably carried by the lower ends of the respective shafts 369 through bearings 391. These blade supports 390 are adapted to fit the top ends of the tooling blades 325 of the inserter B during the coil winding, to thereby prevent the tooling blades from being bent by the tension applied to the coil. Three brackets 392 are secured to the outer surface of the upper end of the housing 345. A first L-shaped bracket 393 is provided at the lower surface of one and thereof with a hollow shaft 394 which is rotatably supported by the plate 358 through a bearing 395. A second L-shaped bracket 396 is also provided at the lower surface of one end thereof with a hollow shaft 397 which is rotatably supported by the bracket 392 through a bearing 398. A slide bars 399 are fixed to a pair of blocks 400 secured to the lower surface of the bracket 393 and slidably extend through linear bearings 401 fixed to the lower surface of the bracket 396. Therefore, the bracket 393 and the bracket 396 are connected to each other through a slide bars 399 such that these two brackets 393, 396 are always on a common line. A guide tube 402 extends through the hollow shaft 397 and is fixed at its one end to a bracket 403 fixed to the aforementioned bracket 396. A block 404 fixed to the bracket 396 is provided at its lower side with a pad 405. A cylinder 406 secured to the bracket 396 has a rod 407 the end of which carries a pad 408 which opposes to the aforementioned pad 405. The guide tube 402 is supported at its lower end by a stand 409a and is positioned above the wire pack 15. A pair of guide rollers 409 are supported by the bracket 393 at a predetermined distance from each other. A cylinder 410 is supported by the bracket 393 through a bracket 411 so as to take a position just above the midway of the distance between the guide rollers 409, and has a rod 412 which rotatably carries a roller 414 through a holder 413. A guide tube 415 is fixed at its one end to the bracket 393 through a bracket 416, while the other end is connected to the hollow shaft 394. Two guide rollers 418 are rotatably secured to the lower surface of the plate 358 through a bracket 417. A wire 16 pulled out from the wire pack 15 is led through the space between the guide tube 402 and the pads 405,408 and is guided by the guide rollers 409. The wire 16 is then led through the guide tube 415 and is guided by the guide rollers 418 to the shaft 369 so as to extend through the latter. The wire 16 is then led through the flyer 389 and is taken out from the end of the latter. Brackets 419 are secured to the lower surface of the plate 359. Cylinders 420 are fixed to the bracket 419 and have rods 421 which carry pads 422. The pads 422 oppose the pads 423 which are fixed to the brackets 419. The pads 422 and 423, in combination, constitute starting lead clamps 424 (424u, 424v, 424w) of the same side as the winding means C. Cylinders 425 are fixed to the plate 359 through brackets 427 in such a manner that their rods 426 oppose to the blade supports 390. Stoppers 428 are connected to the rods 426 of the cylinders 425 and are adapted to be moved into and out of grooves 429 in the blade supports 390 as the cylinders 425 operate.

In the described construction, the flyers 389 are rotated and moved up and down as the motors 362 and 380 operate in synchronism with each other, so that wires are wound and arrayed on the winding forms. By turning the electromagnetic clutch brake units on and off while rotating the motor 362, it is possible to move the flyers 389 to any desired positions. It is also possible to independently rotate each flyer 389u, 389v, or 389w. The cylinder 410 is provided for taking up the slack of wire 16 which may be caused during inching of the flyer 389. Namely, for taking up the slack, two suction/-discharge ports of the cylinder 410 are opened to bring the interior of the 410 into communication with the atmosphere, so that the weights of the rod 412, holder 413 and the roller 414 are applied to the wire 16 thereby to tense the wire 16 to take up the slack of the wire. Before the start of the winding operation, the cylinder 410 is operated to pull up the roller 414 away from the wire 16.

The holding means D is slidably supported by guide bars 431 secured to the lower side of the rails 341 through blocks 430, and is connected to the rod 433 of the cylinder 432 supported by the lower surface of the rails 341, as will be seen from FIG. 1. The holding means D is movable by the operation of the cylinder 432 between a stator core supply/discharge position shown by full line and a coil insertion position shown by two-dots-and-dash line.

Figure 24:
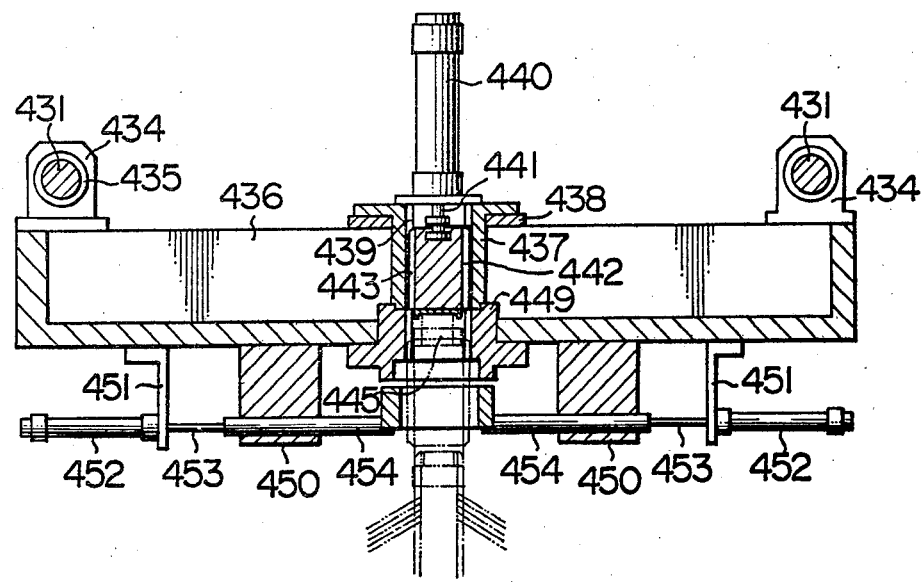
FIG. 24 is a sectional side elevational view of the holding means incorporated in the machine as shown in FIG. 1.
Figure 25:
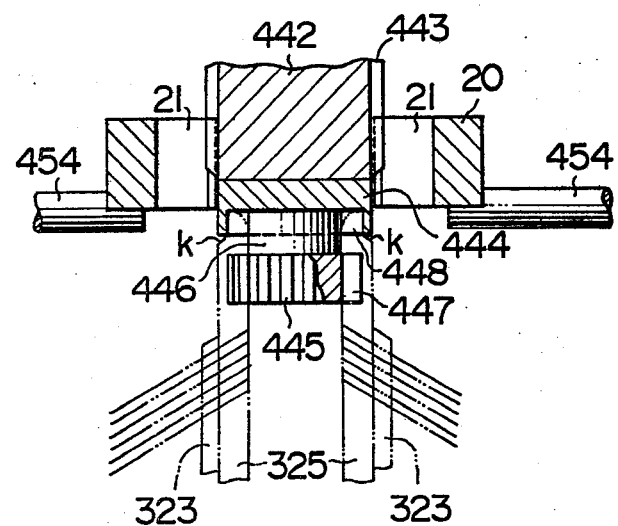
FIG. 25 is an enlarged view showing the state of operation of an essential part of the holding means shown in FIG. 24.

As shown in FIGS. 24 and 25, the holding means D includes a pair of holders 434 slidably supported by the guide bars 431 through a linear bearings 435. A box-shaped frame 436 is supported by the holders 434. A guide 437 is carried by a bracket 438 fixed to the frame 436 and is provided therein with four grooves 439. A cylinder 440 is supported by the guide 437 and has a rod 441 projecting into the guide 437. A core guide 442 is rotatably carried by the end of the rod 441 and is provided on its outer periphery with four projections 443 slidably engaging the grooves 439 in the guide 437. A blade guide 444 is fixed to the lower end of the core guide 442. An alignment tool 445 is integrally secured to the lower side of the blade guide 444 with a spacer 446 interposed therebetween. The alignment tool 445 is provided in its outer peripheral surface with thirty-six grooves 447 which are adapted to be engaged by the tooling blades 325. A groove 448 formed between the blade guide 444 and the spacer 446 is adapted to receive the ends of the tooling blades 325 provided with notches d. A core retainer 449 is fixed to the frame 436 such that the lower end of the guide 437 fits thereto. A pair of guide blocks 450 are supported by the frame 436 in such a manner so as to oppose each other with the core retainer 449 placed therebetween. A pair of cylinders 452 are supported by the frame 436 through a pair of brackets 451 so as to oppose each other with the guide block 450 placed therebetween. The cylinders 452 have rods 453 which are provided at their ends with holders 454 slidably extending through the guide blocks 450. The arrangement is such that the cylinders 452 operate to make the holders 454 cooperate with each other to thereby hold the stator core 20. As the cylinder 440 operates while the holders 454 hold the stator core 20, the core guide 442 is lowered to bring the projections 443 into engagement with the slots 221 of the core 20 to thereby index the core 20. Also, the alignment tool 445 engages the inner side of the end of the tooling blades 325 to correct the position of the tooling blades 325. At the same time, the blade guide 444 fit in the notches k formed in the ends of the tooling blades 325 to thereby to correct the divergence of the tooling blades. The supply of the stator core 20 to the holder means D is made by feeding the stator core 20 by means of a chute 460, clamping the stator core 20 in the thickness-wise direction by a chuck 461 and moving the chuck 461 up and down by means of the cylinder 462.

Figure 26A:
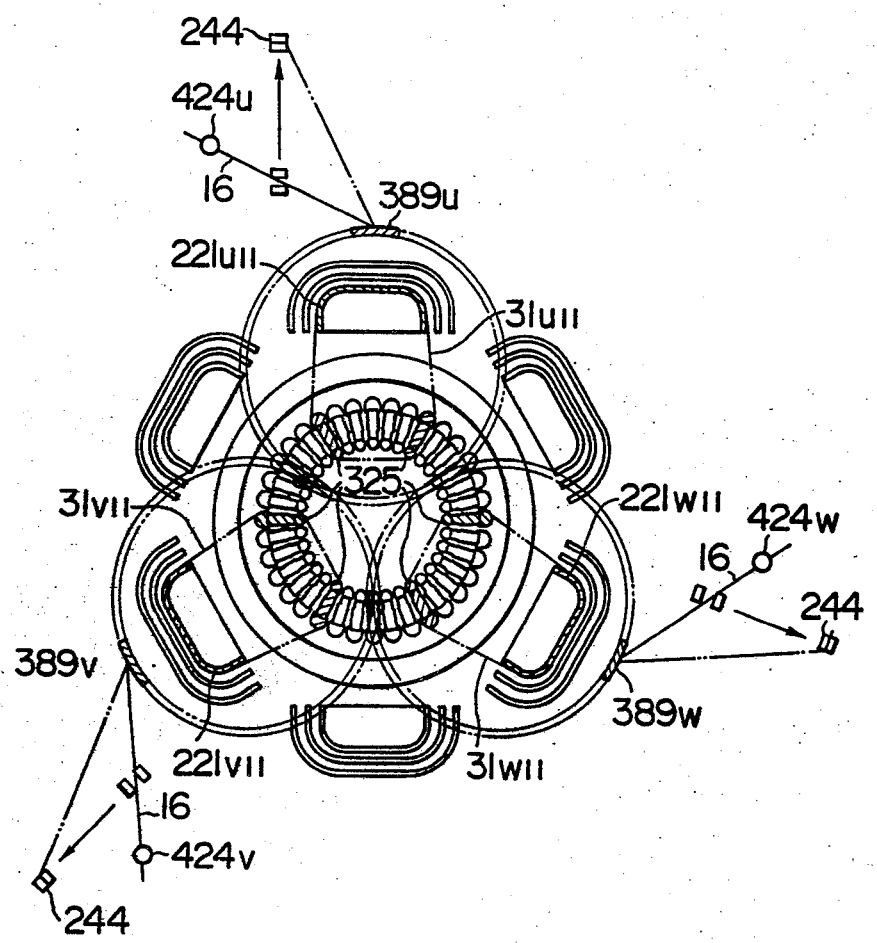
FIGS. 26A to 26K show the steps of coil winding and inserting process.
Figure 26B:
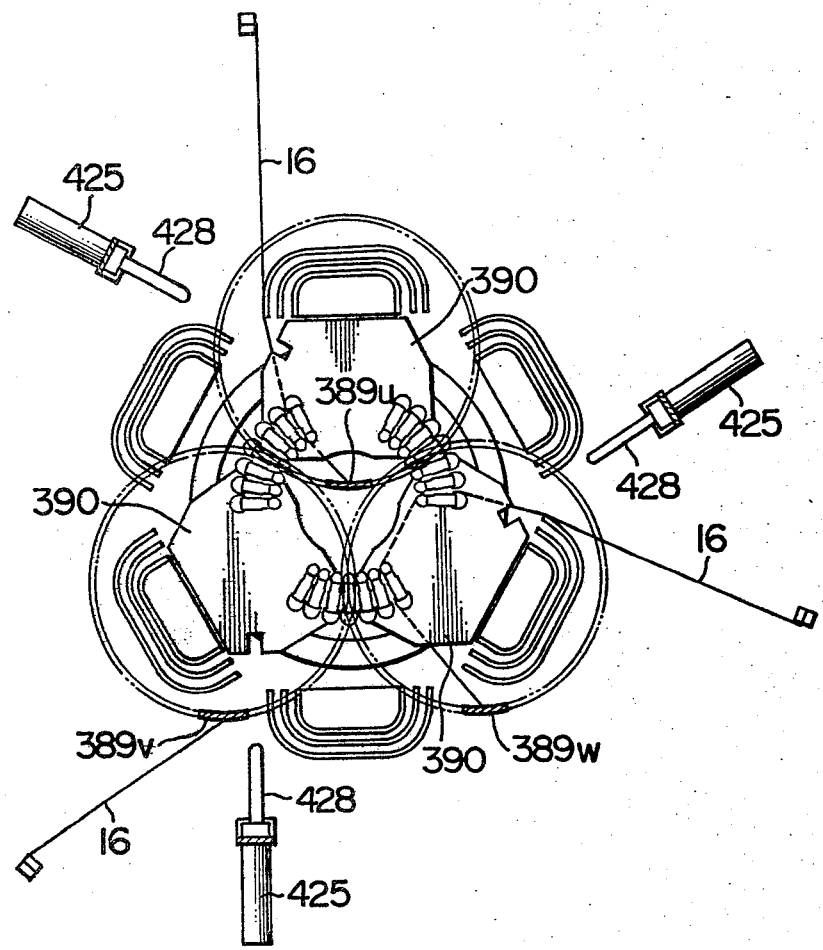
Figure 26C:
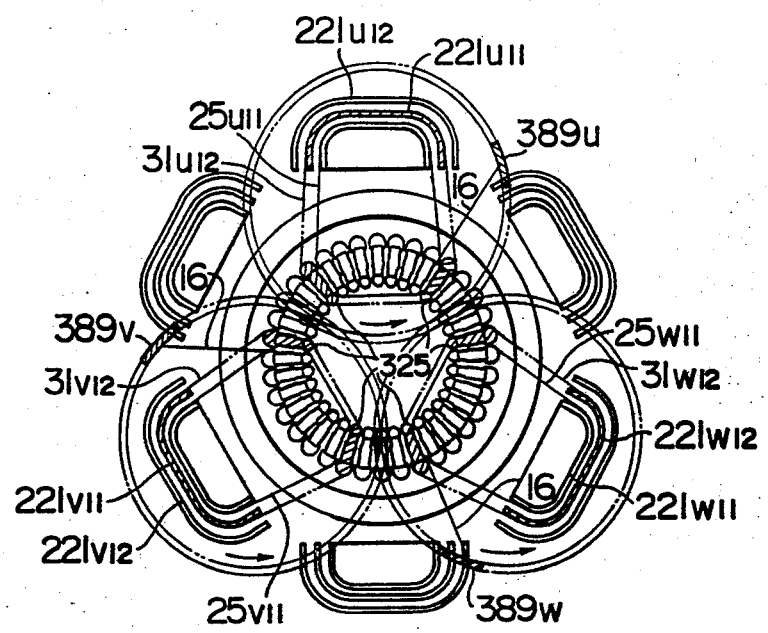
Figure 26D:
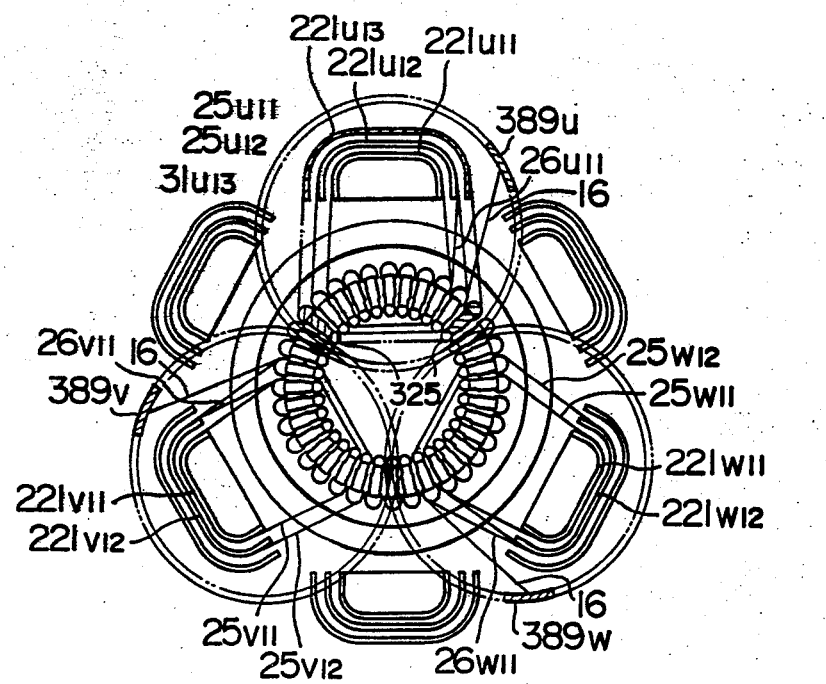

In the operation of the described arrangement, the driving unit $B_2$, selector unit $B_3$ and the insertion unit $B_5$ of the inserter B are set at the state before the start of the winding, and the winding means C is stationed at the position above the inserter B. In this state, the starting lead clamps 424 of the winding means clamp the wires 16 are taken out from corresponding flyers 389. At the same time, the motor 68 of the wedge supplying means A is started to supply the magazine 58 with the wedges. At shown in FIG. 26A, the flyers 389u, 389v and 389w take positions remote from the center of the insertion unit $B_5$. Then, the cylinders 233 of the starting lead holder units $B_{42}$ of the inserter B are started to advance the fingers 244 to the positions beneath the wires 16 and then the cylinders 224 start to raise the fingers 244 to the level of the wires 16. Subsequently, the cylinders 238 are activated to move the fingers 244 of each pair toward each other to thereby clamp and hold the wires 16. Thereafter, the cylinders 420 are operated to make the starting lead clamps 424 release the wires 16. At the same time, the cylinder 233 is activated to retract the fingers 244 and then the cylinder 224 is activated to station the fingers 244 at positions where they do not impede the winding operation. The wires 16 are pulled out from the flyers 389 in this state. At the same time, the inserter B operates to raise the auxiliary plates 221u11, 221v11 and 221w11 together with six tooling blades 325, two blades being associated with each auxiliary plate, to the winding position thereby to form three winding forms 31u11, 31v11 and 31w11. The wedge guides 323 and the back-up blades 316 are simultaneously raised with the lifting of the tooling blades 325 to the winding position. Then, after the tooling blades 325 have reached the winding position as shown in FIG. 26B, the ends of the tooling blades 325 and the back-up blades 316 fit in the holes in the blade supports 390. Then, the cylinders 425 ae operated to disengage the stoppers 428 from the grooves 429. Subsequently, the motor 362 and the electromagnetic clutch brake units 368 are operated to move the three flyers 389u, 389v and 389w to the position shown in the drawings. The motors 362 and 380 are operated to rotate and vertically drive three flyers 389u, 389v, 389w simultaneously, so that coils 25u11, 25v11 and 25w11 are formed around the winding forms 31u11, 31v11 and 31w11, respectively. As the desired number of turns of coils are completed, the flyers 389u, 389v and 389w are at the illustrated positions in FIG. 26C. Then, the inserter B is operated to lift the auxiliary plates 221u12, 221v12 and 221w12 and six tooling blades 325, two blades being associated with each auxiliary plate, to thereby form winding forms 31u2, 31v2 and 31w2, respectively. Then, the flyers 389u, 389v and 389w are rotated again to thereby to form coils 25u12, 25v12 and 25w12 around the winding forms 31u12, 31v12 and 31w12, respectively, as shown in FIG. 26D. The flyers 389u, 389v and 389w are then stopped at the illustrated positions. The crossover 26u11 between the coil 25u11 and the coil 25u12 is formed to extend between the tooling blade 325 and the auxiliary plate 221u12. Other crossovers are formed at similar positions. Then, the inserter B operates to raise only the auxiliary plate 221u13 and two tooling blades 325 associated with the auxiliary plate 221u13 to form a winding forms 31u13.

Figure 23:
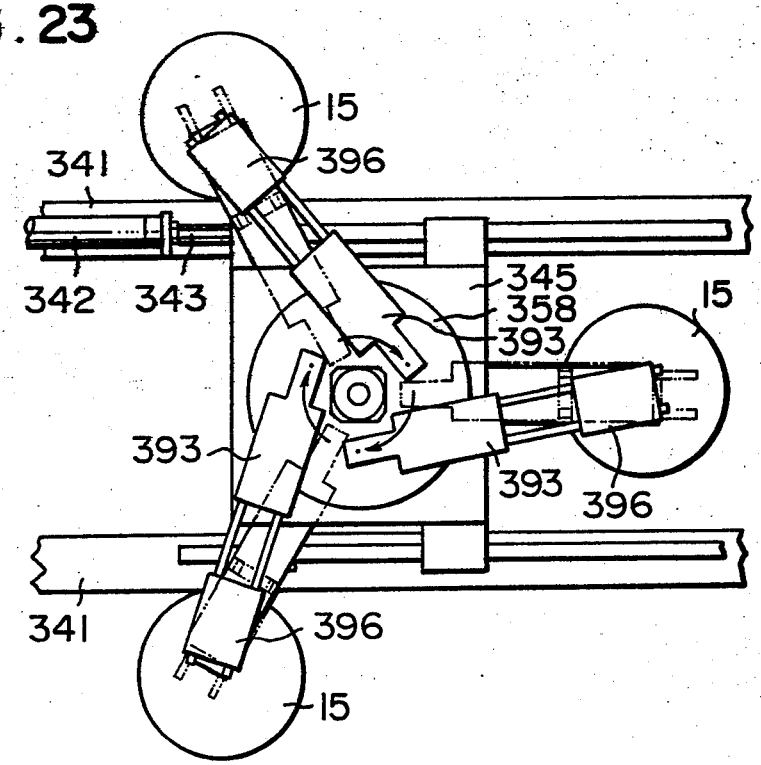
FIG. 23 is a plan view of the winding means explanatory of the operation of the winding means.
Figure 26E:
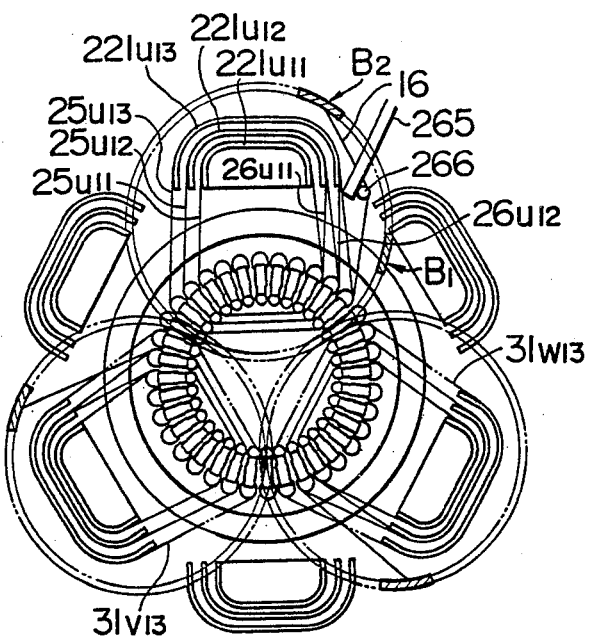
Figure 26F:
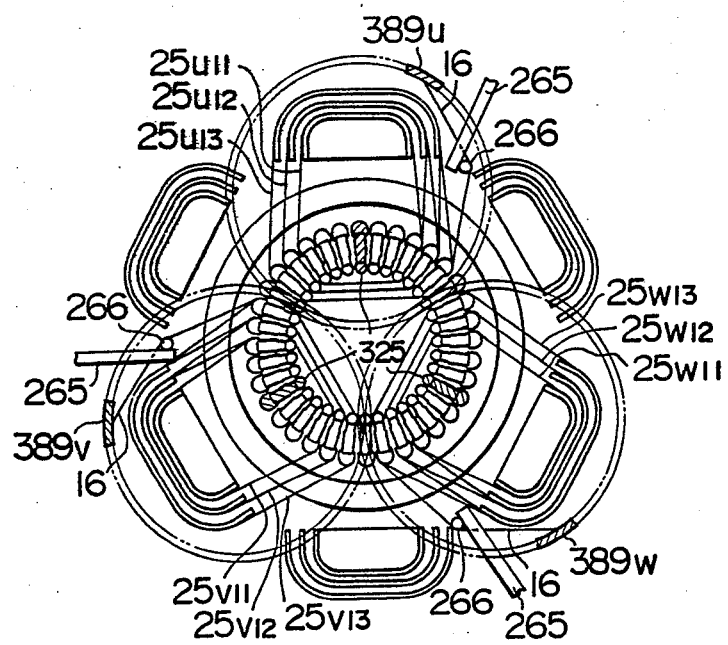
Figure 26G:
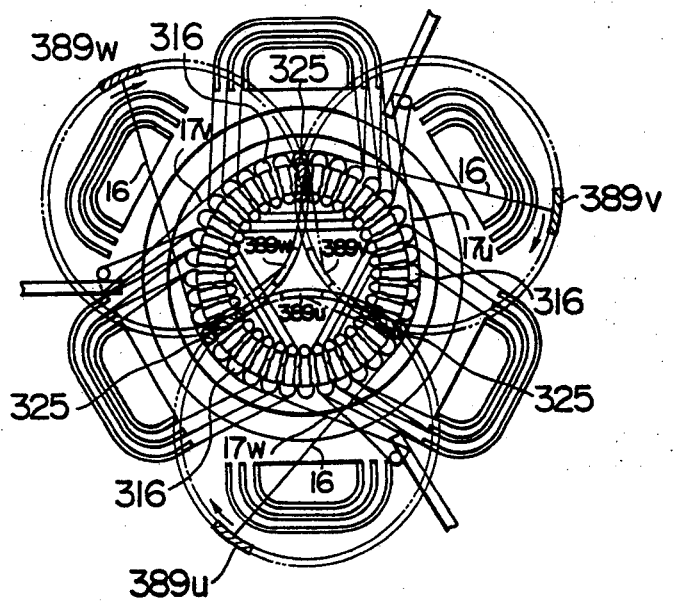

Then, the clutches in the electromagnetic clutch brake units 368v and 368w are turned off and the brakes are put into effect. As only the motors 362 and 380u are operated in this state, only the flyer 389u is rotated and slid to thereby form a coil 25u3 around the winding form 31u3 as shown in FIG. 26E. Then, the flyer 389u is stopped at the illustrated position $B_1$. Subsequently, the cylinders 250 and 253 of the crossover holder unit $B_{43u}$ are activated to raise the base 258 to the position $A_1$. As a result, the hook pin 266 projects to the area in the vicinity of the end of the coil 25u13 of the auxiliary plate 221u13. Then, the flyer 389u is rotated to the position $B_2$ so that the wire 16 is wound round the hook pin 266. Consequently, the cylinder 263 operates to make the hook pin 265 project into contact with the side portion of the hook pin 266 adjacent to the auxiliary plate 221u13 thereby to prevent the wire 16 from coming out of the hook pin 266. The inserter B, as well as the cylinder 253 and the motor 380u, are operated to lower the winding forms 31u11, 31u12 and 31u13 and the flyer 389u to the position $A_2$ (position of tooling blades 325 before lifting) shown in FIG. 15. Subsequently, the coils 25u13 and 25w13 are formed successively in the same manner as described above, and then lowered to the position $A_2$ shown in FIG. 15. Thus, all winding forms 31 are aligned in the heightwise direction. Then, the inserter B and the cylinder 250 are activated to lower the bobbins 31u11, 31u12, 31u13, 31v11, 31v12, 31v13, 31w11, 31w12, 31w13 and all tooling blades 325 except three tooling blades 325 hatched in FIG. 26F, as well as the hook pins 265 and 266, are lowered to the position $A_3$ in FIG. 15. Consequently, the tooling blades 325 come off from the blade supports 390. In this state, the cylinder 356 of the winding means is operated to disengage the stopper 355 from the bush 354, and the motor 350 is operated to rotate the drum 346 180° in the clockwise direction. Then, the stopper 355 is inserted into the bush 354 by the operation of the cylinder 356. Consequently, the flyers 389u, 389v and 389w are moved to the position shown in FIG. 26G. Meanwhile, the wires 16 stretched between the flyers 389 and respective coils are led to the flyers 389 from the hook pins 265,266 past the outer side of several back-up blades 316. Incidentally, the distance between the bracket 393 on the drum 346 and the bracket 396 on the bracket 392 is changed. This distance, however, is adjusted by a slide of the slide bars 399 as shown in FIG. 23.

Figure 26H:
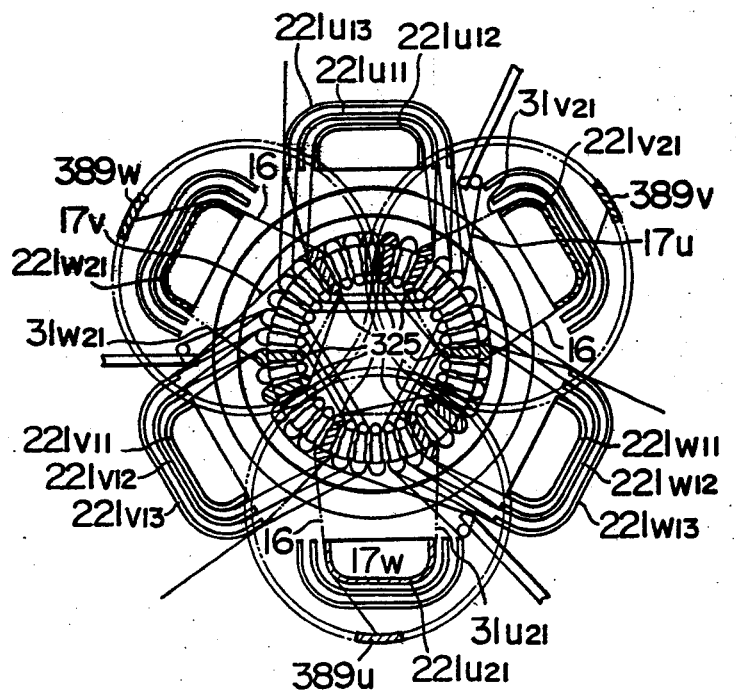
Figure 26I:
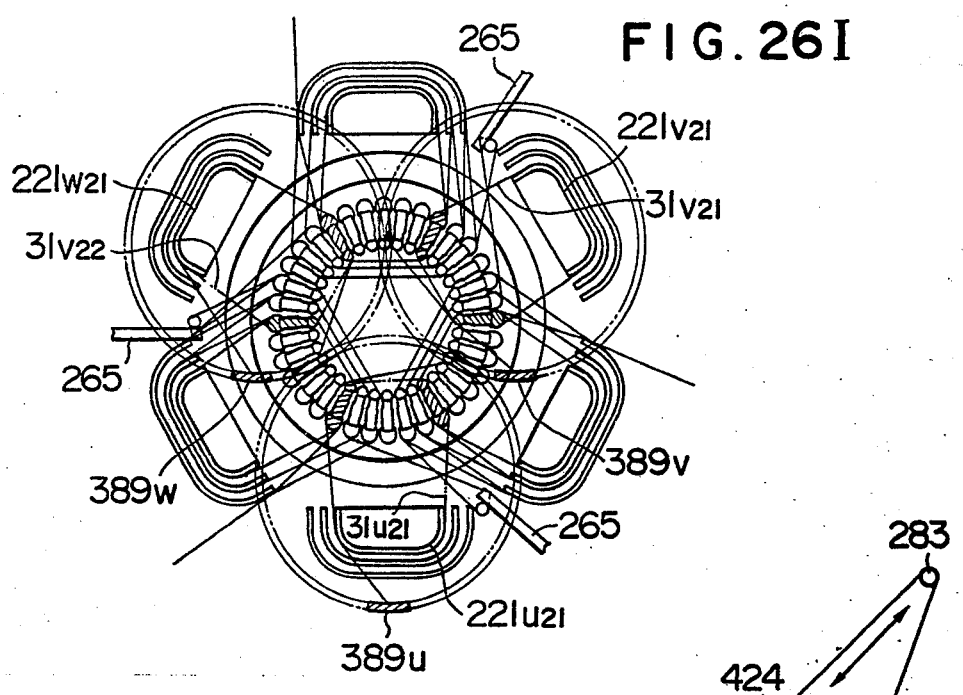
Figure 26J:
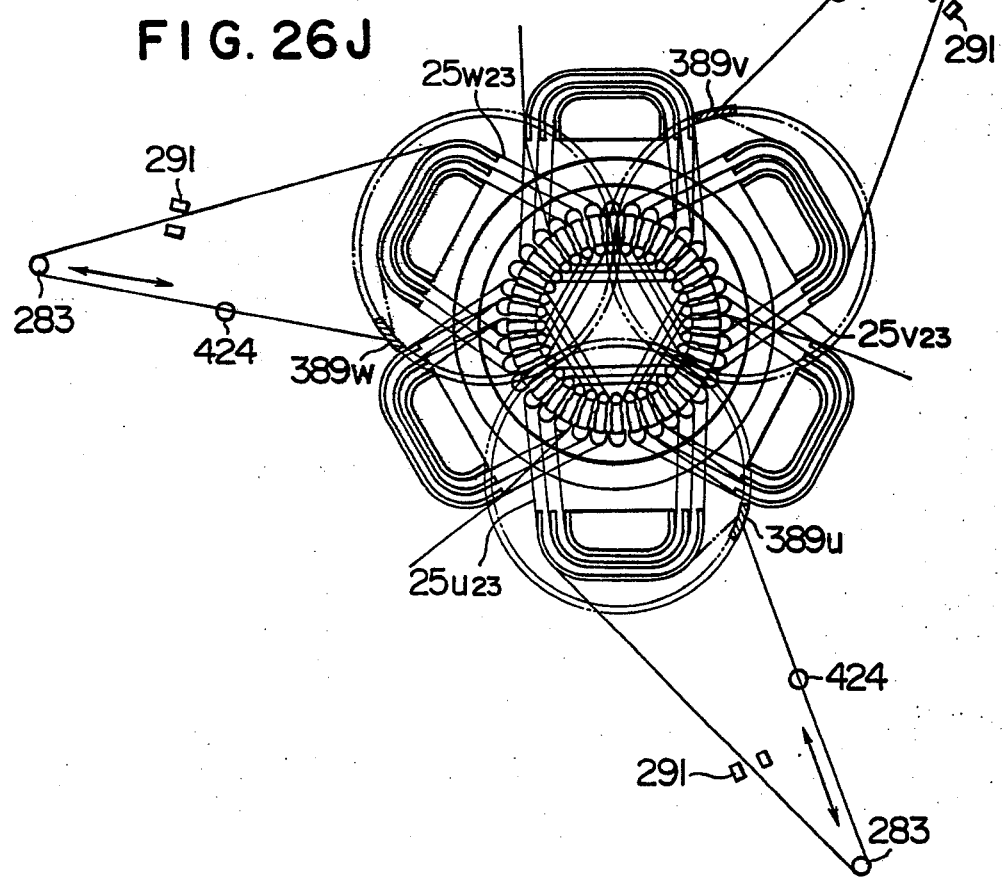

On the other hand, the wedges supplied to the magazine 58 are raised by the wedge pusher 332 and are inserted into the wedge guides 323. Then, the motor 362 is activated to rotate the flyers 389 in the clockwise direction and are moved to the position shown by two-dots-and-dash lines in FIG. 26G. After the start of the rotation of the flyers 389, the cylinders 406 are activated to lift the pads 408 so that the wires 16 are clamped between the pads 408 and 405. Simultaneously, the air suction/discharge ports of the cylinders 410 are opened to make the rollers 414 rest on the wires 16. If any slack is caused in the wires 16 as a result of rotation of the flyers, the wires 16 are depressed by the rollers 414 so that the slack of the wires 16 are absorbed between the guide rollers 409. Meanwhile, the cylinders 193 are operated to move the auxiliary plates 221u11, 221u12, 221u13, 221v11, 22v12, 221v13, 221w11, 221w12 and 221w13 to positions closer to the tooling blades 325, to thereby eliminate the tension in the coils wound round the winding forms 31. The inserter B is activated in this state to lift three auxiliary plates 221u21, 221v21, 221w21 hatched in FIG. 26H, six tooling blades cooperating with these three auxiliary plates in forming winding forms 31u21, 31v21 and 21w21, and three tooling blades 325 for guiding the crossover wires 16u, 16v and 16w to the winding position. Subsequently, the motor 362 is activated to rotate the flyers in the counter-clockwise direction, and the cylinders 410 and 406 are activated to raise the rollers 414 and to unclamp the wires 16. As each flyer 389u, 389v, 389w come to take the position behind each auxiliary plates 221u21, 221v21, 221w21, the motor 362 is stopped to thereby stop the flyers. In this state, the crossover wires 17u, 17v and 17w are led from the outer sides of the back-up blades 316 to the inner side of the tooling blades 325 serving as the guide and are hitched around the winding forms 31u21, 31v21 and 31w21. Thereafter, the inserter B is operated to lower these three tooling blades 325 serving as the guide. Thereafter, the motor 362 and the electromagnetic clutch brake units 368 are activated to move the flyers 389u, 389v and 389w to the positions shown in FIG. 26I. The motors 362 and 380 are operated in this state to rotate the flyers 389 in the counterclockwise direction while raising the same to the position A1 shown in the FIG. 15 to thereby effect the winding for the first coils of the second pole. After the desired winding is over, the electromagnetic clutch brake units 368 operate to stop the flyers 389 at the winding starting positions. After winding the first coils of the second pole, winding of the second and third coils are made in the same procedure as in the coil winding for the first poles. Meanwhile, the cylinders 263 are operated to retract the hook pins 265. Then, as the winding of the all coils is over as shown in FIG. 26J, the flyers 389 are stopped at the winding starting positions. Thereafter, the motor 362 and the electromagnetic clutch brake units 368 are operated to rotate the flyers 389u, 389v and 389w to the illustrated positions and to hold the same at these positions. Then, the cylinders 279 are activated to move the rollers 283 ahead until they pass the spaces beneath the wires 16 which are stretched between the coils 25u23, 25v23, 24w23 and the flyers 389u, 389v, 389w, respectively. Then, the cylinders 270 are activated to bring the rollers 283 to positions in opposition to the wires 16, and the cylinders 279 are operated to retract the rollers 283. As a result, the wires 16 are pulled out by the rollers 283 and are inserted into the space between the fingers and the space between the starting lead clamps 424. The cylinders 286 are operated in this state to make the fingers 291 clamp the wires 16. Simultaneously, the cylinders 420 are operated to make the starting lead clamps 424 clamp the wires 16, while the wires 16 are cut at the sides of the starting lead clamps 424 adjacent to the rollers 283 to thereby form the end leads of the coils 25u23, 25v23, 25w23. Subsequently, the inserter B and the cylinder 270 are activated to lower the coils 25u21, 25u22, 25u23, 25v21, 25v22, 25v23, 25w21, 25w22, 25w23 and the fingers 291 to the position $A_Z$ in FIG. 15. Subsequently, the inserter B operates to raise the tooling blades 325 from the position $A_3$ to the position $A_2$ in FIG. 15, together with the auxiliary plates 221, so that all auxiliary plates 221 and the tooling blades 325 are aligned to prepare for the insertion of the coils.

Figure 26K:
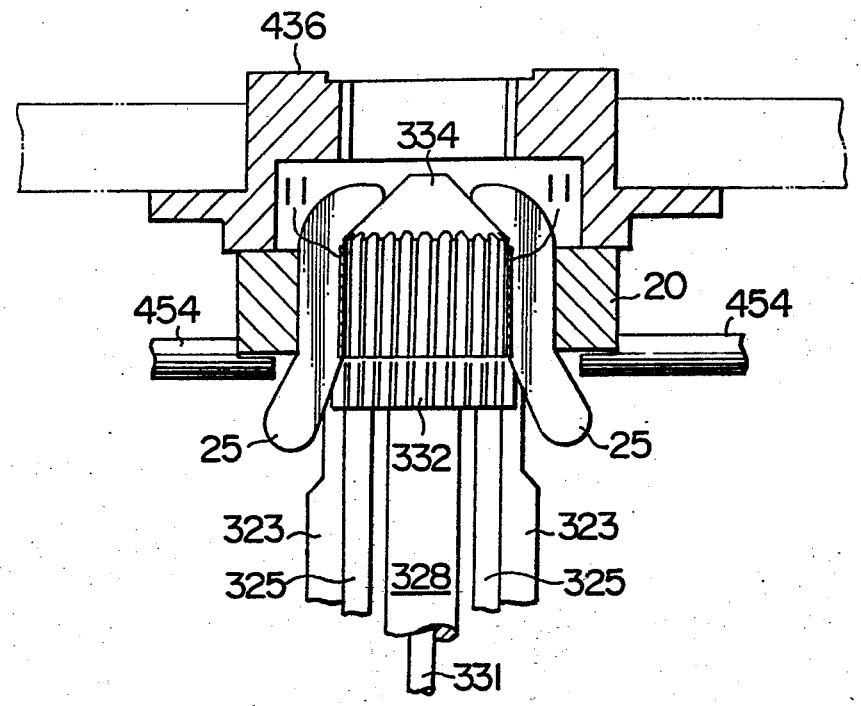
Figure 27:
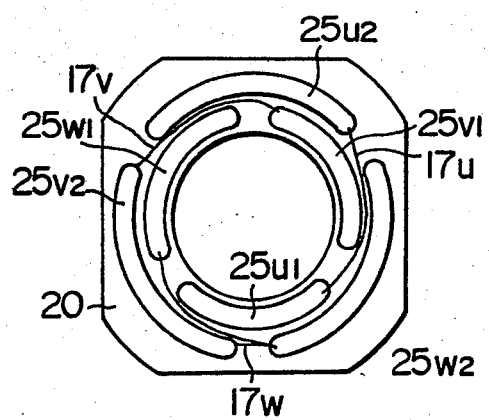
FIG. 27 is a bottom plan view of a stator core with the coils inserted therein.

Meanwhile, the cylinder 324 is activated to shift the winding means C from the winding position shown by the full line to the stand-by position shown by two-dots-and-dash line in FIG. 1. Then, the cylinder 432 is operates the holder means holding the stator core 20 from the supply/discharge position shown by full line to the insertion position shown by two-dots-and-dash line in FIG. 1. Subsequently, the cylinder 440 is activated to fit the core guide 442 in the stator core 20 to thereby index the stator core in the horizontal direction and rotational direction. At the same time, the blade guide 444 and the alignment tool 445 are projected from the lower end surface of the stator core 20. On the other hand, the cylinders 193 are operated to thereby move the auxiliary plates $221u21$, $221u22$, $221u23$, $221v21$, $221v22$, $221v23$, $221w21$, $221w22$, $221w23$ towards the tooling blades 325 to relieve the tension in the coils $25u21$, $25u22$, $25u23$, $25v21$, $25v22$, $25v23$, $25w21$, $25w22$, $25w23$. Then, the cylinder 306 is activated to disconnect the tooling blades 325 from the back-up blades 316 to thereby lock the back-up blades by the cam 301. The inserter B is operated in this state to raise the tooling blades 325 and the wedge pusher 332. Then, as the upper surface of the wedge pusher 332 comes up to the stripper 334, the stripper 334 also starts to move upward together. Consequently, the coils 325 wound around the tooling blades 325 are raised by the stripper 334. At this time, the cylinders 238 and 286 are activated to release the starting and end leads of the coils 25. Then, as the coils 25 are moved upwardly, the coils come off from the auxiliary plates 221 and are guided solely by the tooling blades 325. As the tooling blades 325 are raised, the tooling blades are fitted into the grooves 447 in the alignment tool 445. A further upward movement of the tooling blades 325 brings the end notches k of the tooling blades 325 into engagement with grooves 448 between the blade guide 444 and the spacer 446. The suction and discharge ports of the cylinder 440 are opened to free the rod 441. Then, as the tooling blades 325 are moved further upwardly, the ends of the tooling blades push up the blade guides 444 into the stator core 20. Then, the upward movement of the tooling blades 325 is stopped when the wedge guides 323 touch to the lower end of the stator core. In this state, the notches k in the top ends of the tooling blades 325 project above the upper surface of the stator core 20. Then, the cylinder 440 operates to lift the core guide 442, blade guide 444 and the alignment tool 445. Meanwhile, the wedge pusher 332 and the stripper 334 continue to move upwardly. As the wedge pusher 332 reaches the position of the lower end of the stator core 20, the upper portion of the stripper 334 project through and above the upper surface of the stator core 20. As a result, the coils 25 are inserted into the slots in the stator core, as shown in FIG. 26K. In this state, the coils $25u1$ ($25u11$, $25u12$, $25u13$ and so forth), $25u2$, $25v1$, $25v2$, $25w1$, $25w2$ are arranged on the stator core 20 as shown in FIG. 27. The crossover wires $17u$, $17v$ and $17w$ are led over the bottom surface of the stator core 20 to connect the poles. The wedges 11 pushed up by the wedge pusher 332 are inserted into the slots 21 in such a manner so as to close the openings of the slots 21, to thereby prevent the coils 25 from coming out of the slots 21. After the completion of the insertion of the coils 25 and the wedges 11, the inserter B operates to lower the tooling blade 325 and the wedge pusher 332. However, the stripper 334 remains in the stator core 20 due to the friction produced in the stator core 20. Then, as the wedge pusher 332 lowers the flange 331 at the lower end of the insertion bar 330, the stripper 334 is also lowered leaving the stator core 20. The stripper 334 is then made to fall down along the space between the tooling blades 325 and be supported by the pins 336 provided on the tooling blades 325. Then, the tooling blades 325 are lowered to the position for commencing the winding operation preparing for the next winding. Meanwhile, the cylinder 432 operates to shift the holder means D to the supplying/discharging position. Then, the cylinder 342 is activated to move the winding means C to the winding position.

Needless to say, the coil winding and inserting machine of the invention can carry out other operations than that described in connection with the embodiment.

For forming the coils of a 3-phase bipolar motor having two coils per pole in two, twenty-four tooling blades are used in combination with two auxiliary plates for each pole.

What is claimed is:

1. A coil winding and inserting machine in which flyers are rotated around winding forms constituted by tooling blades arranged on a circle and auxiliary plates disposed at an outer side of said tooling blades to thereby wind multiphase coils, each phase having N poles, around said winding forms, and the coils are directly inserted into a stator core from said tooling blades together with wedges, said coil winding and inserting machine comprising:

an inserter tooling means for forming the winding forms for individual phases of the coils during a coil winding, said inserter tooling means including a plurality of independently liftable tooling blades and a plurality of independently liftable auxiliary plates arranged around said tooling blades, each of said winding forms being formed by two tooling blades and at least one auxiliary plate in a lifted position; and a winding means including a rotatably indexable supporting means for supporting said flyers arranged at a 120° interval on a circle centered at an axis of rotation of said supporting means so as to oppose said winding forms, said flyers being rotatable simultaneously and independently, whereby the winding of coils for a first pole of each phase is effected by independently rotating said flyers simultaneously or sequentially, and the winding for the Nth pole of each phase is effected after an indexing rotation of said supporting means by an angle which is obtained by dividing 360° by the number of poles.

2. A coil winding and inserting machine according to claim 1, wherein said inserter tooling means simultaneously forms three phases of the coil.

3. A coil winding and inserting machine according to claim 1, wherein said inserter tooling means forms three phases of the coil in a predetermined sequence.

4. A coil winding and inserting machine according to claim 1, wherein at least six sets of auxiliary plates are provided.

5. A coil winding and inserting machine according to claim 1, wherein at least twenty-four tooling blades are provided and at least two auxiliary plates are used for forming each pole of the coils.

* * * * *